(12) United States Patent
Yamada

(10) Patent No.: US 8,839,103 B2
(45) Date of Patent: Sep. 16, 2014

(54) PRINTING TRANSITIONS OF SLIDE DATA

(75) Inventor: Jun Yamada, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1113 days.

(21) Appl. No.: 12/147,018

(22) Filed: Jun. 26, 2008

(65) Prior Publication Data

US 2009/0006952 A1    Jan. 1, 2009

(30) Foreign Application Priority Data

Jun. 29, 2007    (JP) ................ 2007-172528

(51) Int. Cl.
*G06F 17/00*    (2006.01)
*G06F 3/12*    (2006.01)

(52) U.S. Cl.
CPC ............ *G06F 3/1206* (2013.01); *G06F 3/1208* (2013.01); *G06F 3/1243* (2013.01)
USPC .......................................... 715/273; 715/732

(58) Field of Classification Search
CPC ................................................ G06F 17/30056
USPC .................... 715/273, 274, 277, 270; 358/1.1
See application file for complete search history.

(56) References Cited

U.S. PATENT DOCUMENTS

| | | | |
|---|---|---|---|
| 5,485,554 A * | 1/1996 | Lowitz et al. | 358/1.17 |
| 7,197,711 B1 * | 3/2007 | Crosbie et al. | 715/732 |
| 2002/0158852 A1 * | 10/2002 | Mori et al. | 345/173 |
| 2005/0111041 A1 * | 5/2005 | Salmi et al. | 358/1.18 |
| 2005/0223309 A1 | 10/2005 | Lee et al. | |
| 2006/0052118 A1 * | 3/2006 | Furon et al. | 455/466 |
| 2006/0232836 A1 * | 10/2006 | Yamada et al. | 358/527 |
| 2007/0226625 A1 * | 9/2007 | Cardone et al. | 715/732 |
| 2008/0259090 A1 * | 10/2008 | Rao | 345/593 |
| 2009/0059300 A1 * | 3/2009 | Torisaki et al. | 358/1.18 |

FOREIGN PATENT DOCUMENTS

| | | |
|---|---|---|
| JP | 2000-190592 | 7/2000 |
| JP | 2001-127995 | 5/2001 |
| JP | 2001-265378 | 9/2001 |
| JP | 2006-243894 A | 9/2006 |

OTHER PUBLICATIONS

JP Office Action dtd Apr. 21, 2009, JP Appln. 2007-172528.
Extended EP Search Report and Search Opinion dtd Sep. 23, 2010, EP Appln. 08011528.0.
Echo Swinford: "Fixing PowerPoint Annoyances", Feb. 17, 2006, O'Reilly Media, Inc, XP002599926, ISBN: 978-0-596-10004-9, pp. 270-271.
EP Patent Application No. 08011528.0, Office Action mailed Oct. 31, 2012.
Notice of Re-examination Decision issued in Chinese counterpart Application No. 200810127388.6, mailed on May 14, 2012.
Notification of Reexamination dated Jun. 24, 2011 in Chinese Application No. 2008-10127388 and English translation thereof.

* cited by examiner

*Primary Examiner* — Adam M Queler
(74) *Attorney, Agent, or Firm* — Banner & Witcoff, Ltd.

(57) ABSTRACT

There is provided a computer-readable record medium storing computer-readable instructions that cause a computer to execute a developing step of developing slide data representing transitions of display states into multiple pieces of display data each of which represents each display state corresponding to each transition and a print data generating step of generating print data to be used for printing based on the multiple pieces of display data corresponding to transitions obtained by the developing step.

19 Claims, 22 Drawing Sheets

PRINTING TRANSITIONS OF SLIDE DATA

CROSS-REFERENCE TO RELATED APPLICATION

This application claims priority under 35 U.S.C. §119 from Japanese Patent Application No. 2007-172528 filed on Jun. 29, 2007. The entire subject matter of the application is incorporated herein by reference.

BACKGROUND

1. Technical Field

The present invention relates to a computer-readable record medium storing a printer driver program for generating print data (data to be used for printing) based on electronic data created by use of application software, etc., and a print data generating device.

2. Related Art

In a technique described in Japanese Patent Provisional Publication No. 2001-265378, a printout for allowing the user to easily grasp the contents of audio data and video data is automatically generated by extracting sampling data from the audio data and the video data (by sampling the audio and video data at regular time intervals), generating character data (text data) from the sampling data regarding the audio data, and generating still image data from the sampling data regarding the video data.

SUMMARY OF THE INVENTION

Meanwhile, a variety of application software for creating presentation documents (hereinafter referred to simply as "creation software") is available today (e.g. Microsoft® PowerPoint®). The user of such creation software can change (cause transition to) the display state on the display, screen, etc. (display contents) by operating a pointing device such as a mouse (hereinafter referred to as a "pointer").

The above creation software implements the changes (transitions) of the display state on the display/screen in response to the user's pointer operations by prestoring information on the background of the display, display contents (contents of information displayed on the display/screen) and a scenario (relationship between the pointer operations and the changes (transitions) of the display contents) while managing a series of transitions as a piece of slide data.

Thus, the above creation software, generating each piece of display data each time based on the stored scenario and the user's pointer operation (without originally having display data representing each display state corresponding to (i.e. after) each transition), is incapable at present of printing out each piece of display data (each display data) corresponding to each transition.

The present invention, which has been made in consideration of the above problem, is advantageous in that a computer-readable record medium (storing a printer driver program) and a print data generating device, realizing the printing of display data corresponding to each transition in slide data created by use of creation software, can be provided.

In accordance with an aspect of the present invention, there is provided a computer-readable record medium storing computer-readable instructions that cause a computer to execute a developing step of developing slide data representing transitions of display states into multiple pieces of display data each of which represents each display state corresponding to each transition and a print data generating step of generating print data to be used for printing based on the multiple pieces of display data corresponding to transitions obtained by the developing step.

By making a computer operate according to the computer-readable instructions obtained (loaded, installed, etc.) from the record medium, the slide data (representing transitions of display states) is developed into multiple pieces of display data (each representing each display state corresponding to each transition) and the print data is generated based on the multiple pieces of display data, by which the printing of the display data corresponding to each transition is realized.

In accordance with another aspect of the present invention, there is provided a print data generating device for generating print data to be used for printing, comprising a developing unit which develops slide data representing transitions of display states into multiple pieces of display data each of which represents each display state corresponding to each transition and a print data generating unit which generates print data to be used for printing based on the multiple pieces of display data corresponding to transitions obtained by the developing unit.

Also with the print data generating device, developing the slide data (representing transitions of display states) into multiple pieces of display data (each representing each display state corresponding to each transition) and generating the print data based on the multiple pieces of display data, the printing of the display data corresponding to each transition is realized.

BRIEF DESCRIPTION OF THE ACCOMPANYING DRAWINGS

Figure 23A:
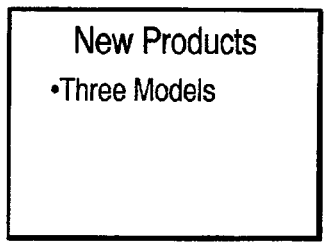
Figure 23B:
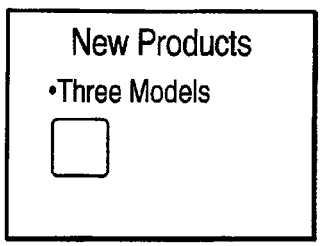
Figure 23C:
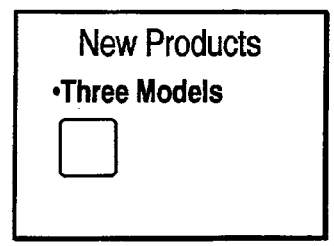
Figure 23D:
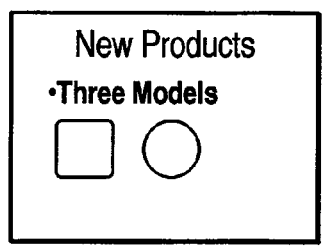
Figure 23E:
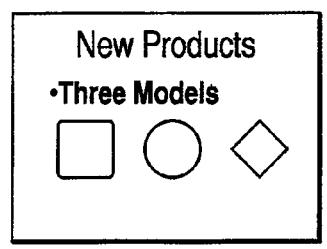
Figure 24:
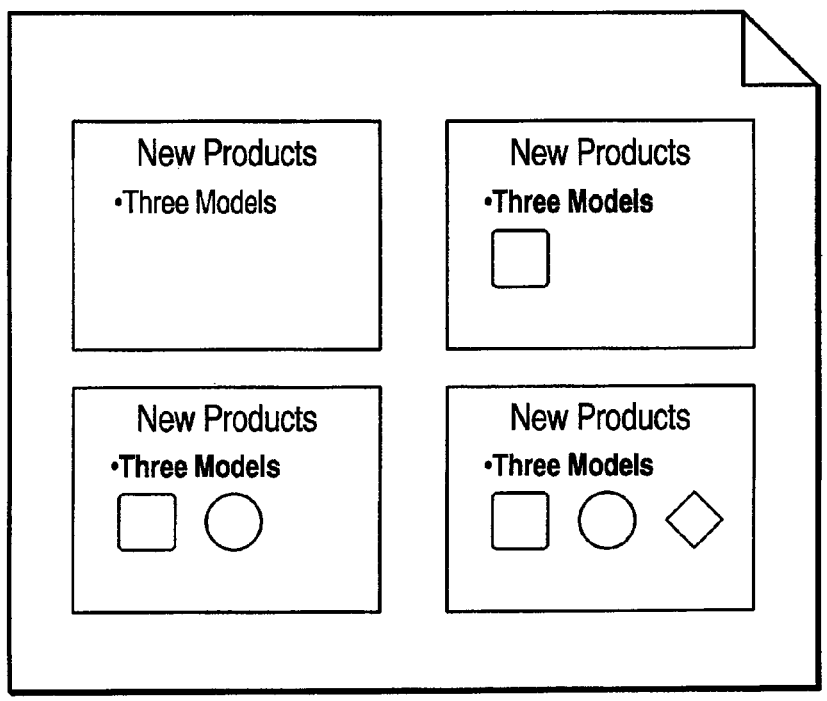

FIGS. 23A-23E are schematic diagrams showing another example of display state transitions of slide data created by use of presentation document creation software and FIG. 24 is a schematic diagram showing an example of a printout (of the slide data representing the display state transitions of FIGS. 23A-23E) obtained by use of a printer driver in accordance with a tenth embodiment of the present invention.

DETAILED DESCRIPTION OF THE EMBODIMENTS

Referring now to the drawings, a description will be given in detail of preferred embodiments in accordance with the present invention.

Embodiment 1

Figure 1:
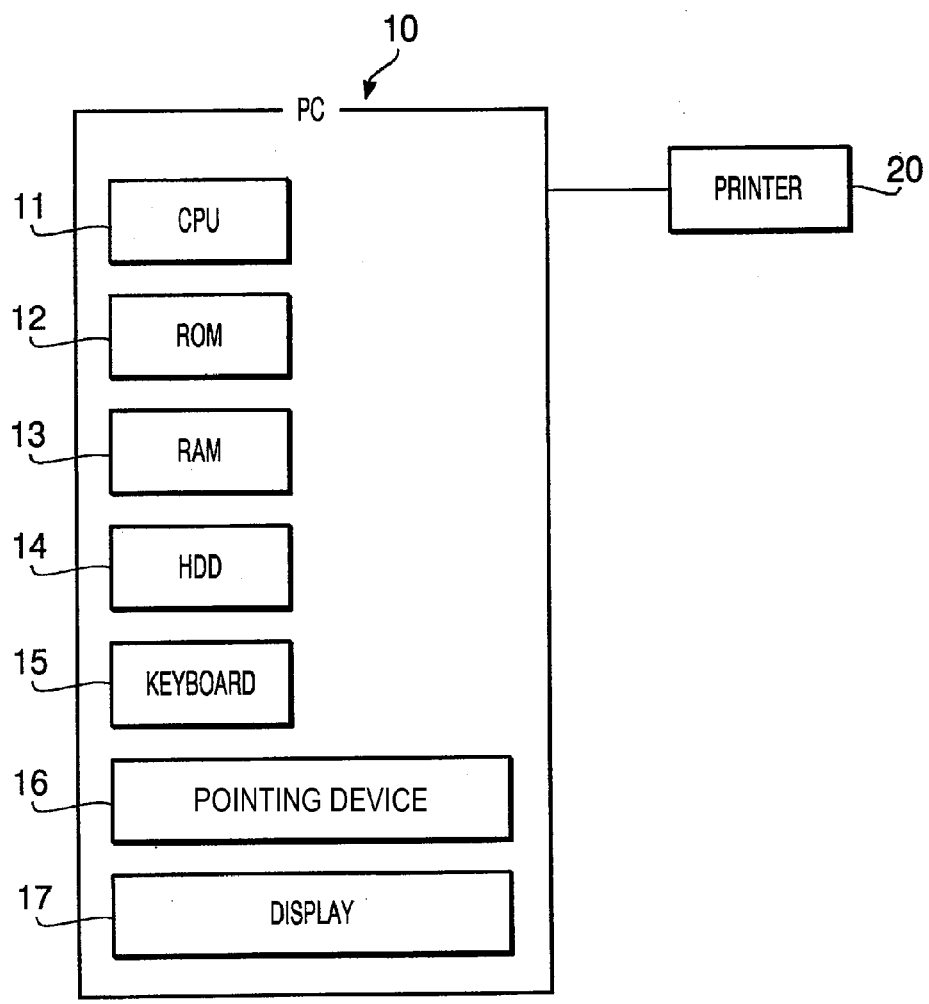
FIG. 1 is a conceptual diagram of a printing system including a printer and a computer in which a printer driver (printing program) in accordance with a first embodiment of the present invention has been installed.
Figure 2:
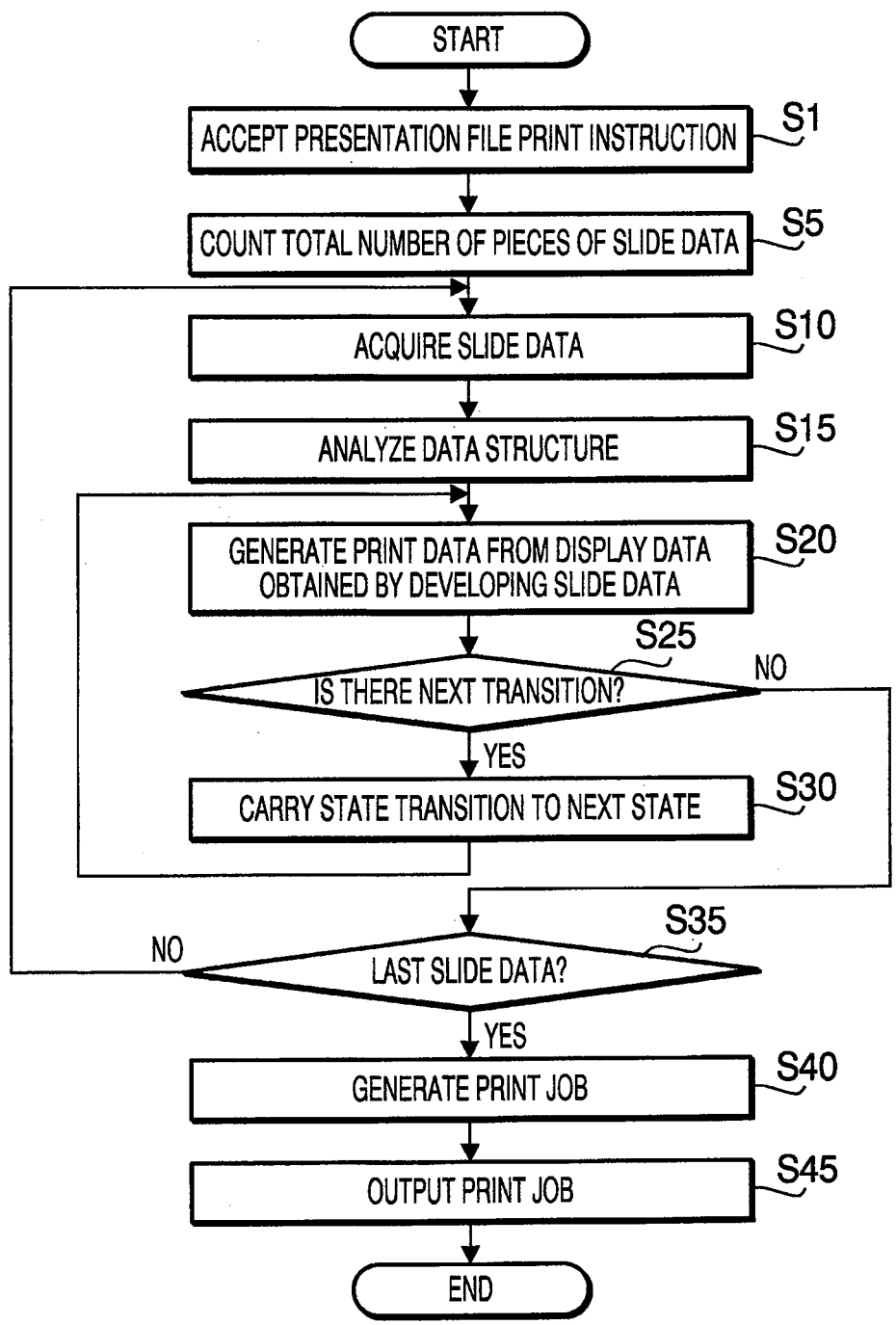
FIG. 2 is a flowchart showing control by (characteristic operation of) the printer driver of the first embodiment.
Figure 3A:
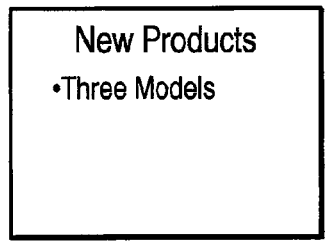
FIGS. 3A-3D are schematic diagrams showing an example of display state transitions of slide data created by use of presentation document creation software.
Figure 3B:
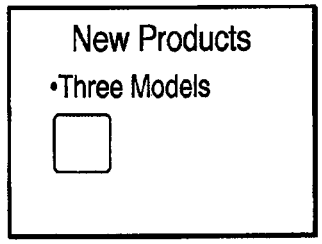
Figure 3C:
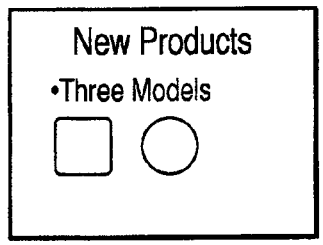
Figure 3D:
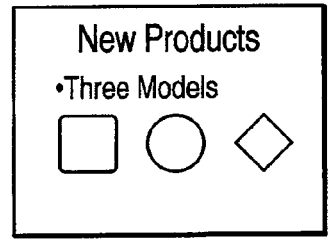
Figure 4A:
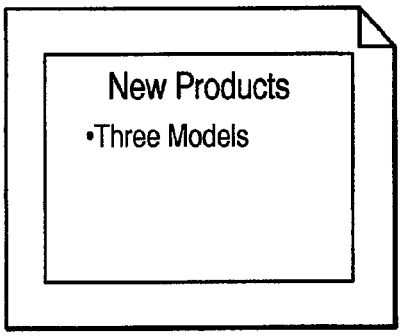
FIGS. 4A-4D are schematic diagrams showing examples of printouts (corresponding to FIGS. 3A-3D) obtained by use of the printer driver of the first embodiment.
Figure 4B:
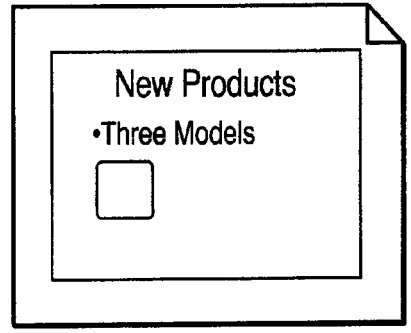
Figure 4C:
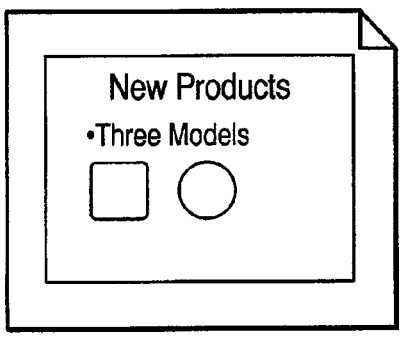
Figure 4D:
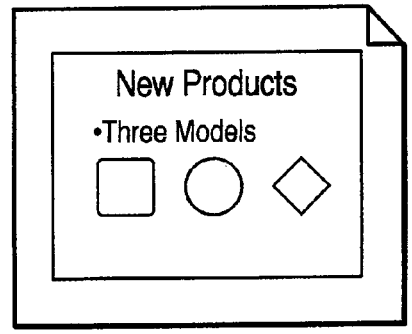

FIG. 1 is a conceptual diagram of a printing system including a printer 20 and a computer 10 in which a printer driver (printing program) in accordance with a first embodiment of the present invention has been installed. FIG. 2 is a flowchart showing control by (characteristic operation of) the printer driver of the first embodiment.

FIGS. 3A-3D are schematic diagrams showing an example of display state transitions of slide data created by use of presentation document creation software (creation software) such as Microsoft® PowerPoint®. FIGS. 4A-4D are schematic diagrams showing examples of printouts (corresponding to FIGS. 3A-3D) obtained by use of the printer driver of the first embodiment.

The computer 10, which is implemented by a PC (Personal Computer) for example, comprises a computation unit including a CPU (Central Processing Unit) 11, a ROM (Read Only Memory) 12 and a RAM (Random Access Memory) 13, a high-capacity storage unit such as an HDD (Hard Disk Drive) 14, a keyboard 15, a pointing device (pointer) 16 (e.g. mouse) and a display 17 (LCD, CRT, etc.), like widely known computers. The printer 20 is connected to the computer 10.

The printer driver, which is usually stored in the HDD 14, is read out and activated by the CPU 11 as needed.

The flowchart of FIG. 2 shows a process for generating printouts like those shown in FIGS. 4A-4D by developing slide data (representing display state transitions FIG. 3A→FIG. 3B→FIG. 3C→FIG. 3D, for example) into multiple pieces of display data each of which represents each display state corresponding to (after) each transition.

Incidentally, the printouts of the four pieces of slide data of FIGS. 3A, 3B, 3C and 3D are shown in FIGS. 4A, 4B, 4C and 4D, respectively.

In the following, characteristic operation of the printer driver of the first embodiment will be described referring to FIG. 2.

The printer driver implementing the process shown in FIG. 2 is activated by the CPU 11 when a print instruction is issued by the user by operating the keyboard 15 or the pointing device 16 of the computer 10. First, the CPU 11 executing the printer driver accepts the instruction for printing a presentation file (S1) and counts the total number of pieces of slide data included in the presentation file (S5).

The "slide data" is data containing information on the display background, the display contents (contents of information displayed) and the scenario (relationship between the pointer operations and the changes (transitions) of the display contents) as mentioned above. Thus, a series of transitions like that shown in FIG. 3 is represented by a piece of slide data.

After counting the total number of pieces of slide data (S5), the CPU 11 acquires a piece of slide data (one of the counted pieces of slide data) (S 10), and analyzes the structure of the acquired slide data (S15). The "structure" is defined by the "creation software" and contains information on how to display the state transition. The CPU 11 then generates print data by developing the slide data into display data (e.g. bitmap data developed in the RAM 13) representing each display state corresponding to (after) each transition (S20) which reflects the state transition realized by the "creation software".

Subsequently, the CPU 11 judges whether there exists the next transition (next display state) or not (S25). If there exists the next transition (S25: YES), the CPU 11 carries the state transition to the next state (S30) and returns to the step S20 to generate the next piece of print data.

On the other hand, if there exists no next transition (S25: NO), the CPU 11 judges whether the currently developed slide data is the last slide data or not, that is, whether there remains no other slide data or not (S35). If not the last slide data (S35:NO), the CPU 11 returns to the step S10 to repeat the steps S10-S30 for the next piece of slide data.

If the currently developed slide data is the last slide data in S35 (S35: YES), the CPU 11 generates a print job based on the print data generated in S20 (S40) and outputs the generated print job to the printer 20 (S45).

As described above, the printer driver of the first embodiment generates the print data by developing the slide data (representing successive transitions of display states) into multiple pieces of display data (e.g. bitmap data developed in the RAM 13) each representing each display state corresponding to (after) each transition (S15, S20), by which the printing of the display data corresponding to each transition is realized.

Embodiment 2

A printer driver in accordance with a second embodiment of the present invention will be described below. The printer driver of the second embodiment generates the print data so that multiple pieces of display data regarding (obtained from) a piece of slide data are printed on one sheet as shown in FIG. 5.

Figure 5:
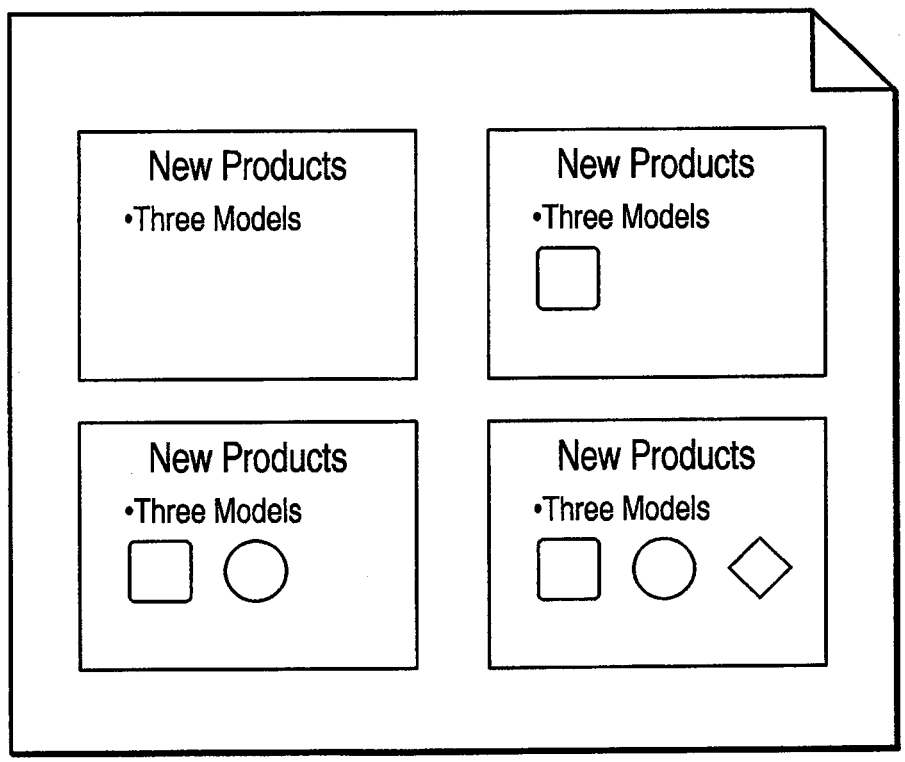
FIG. 5 is a schematic diagram showing an example of a printout (of the slide data representing the display state transitions of FIGS. 3A-3D) obtained by use of a printer driver in accordance with a second embodiment of the present invention.
Figure 6:
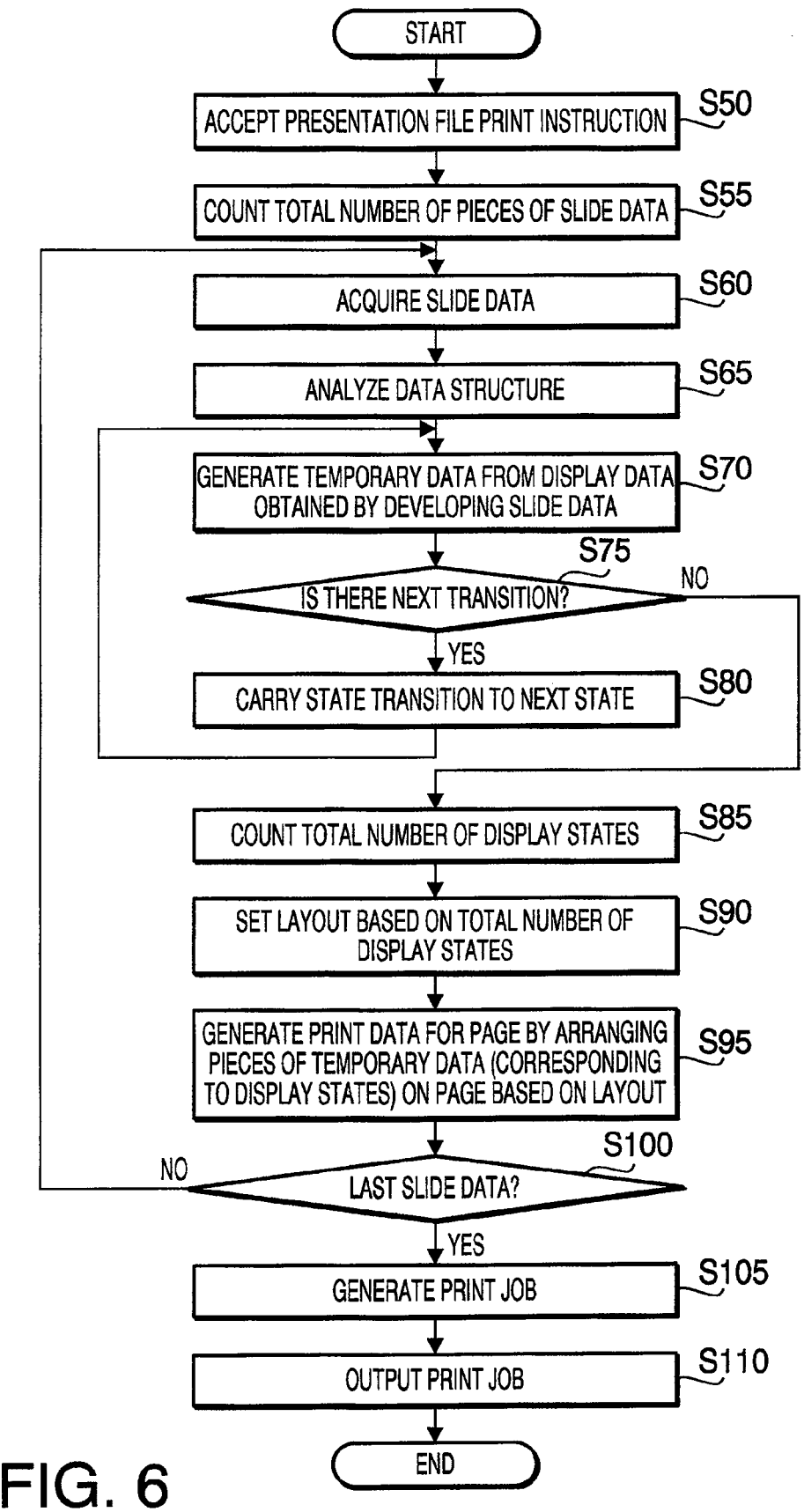
FIG. 6 is a flowchart showing control by the printer driver of the second embodiment.

FIG. 5 is a schematic diagram showing an example of a printout (of the slide data representing the display state transitions of FIGS. 3A-3D) obtained by use of the printer driver of the second embodiment. FIG. 6 is a flowchart showing control by the printer driver of the second embodiment.

In the following, characteristic operation of the printer driver of the second embodiment will be described referring to FIG. 6.

The printer driver implementing the process shown in FIG. 6 is activated by the CPU 11 when a print instruction is issued by the user by operating the keyboard 15 or the pointing device 16. First, the CPU 11 executing the printer driver accepts the instruction for printing a presentation file (S50) and counts the total number of pieces of slide data included in the presentation file (S55).

After counting the total number of pieces of slide data (S55), the CPU 11 acquires one of the counted pieces of slide data (S60), analyzes the structure of the acquired slide data (S65), and generates temporary data for printing by developing the slide data into display data representing each display state corresponding to (after) each transition (S70).

Subsequently, the CPU 11 judges whether there exists the next transition (next display state) or not (S75). If there exists the next transition (S75: YES), the CPU 11 carries the state transition to the next state (S80) and returns to the step S70 to generate the next piece of temporary data corresponding to the next display state.

On the other hand, if there exists no next transition (S75: NO), the CPU 11 counts the number of display states included in the current slide data (S85) and sets the layout (positions of arrangement of the pieces of temporary data on a page) based on the counted number of display states (S90). Subsequently, the CPU 11 generates print data for a page by arranging the pieces of temporary data (corresponding to the display states) on the page based on the layout set in S90 (S95).

Subsequently, the CPU 11 judges whether the currently developed slide data is the last slide data or not (S100). If not the last slide data (S100: NO), the CPU 11 returns to the step S60 to repeat the steps S60-S95 for the next piece of slide data.

If the currently developed slide data is the last slide data in S100 (S100: YES), the CPU 11 generates a print job based on the print data generated in S95 (S105) and outputs the generated print job to the printer 20 (S110).

As described above, the printer driver of the second embodiment generates the multiple pieces of temporary data corresponding to the display states (represented by a piece of slide data), as the print data for one page (S95). Therefore, the user viewing each page (printout of the print data) can easily recognize the transitions of display states in units of slide data (recognize the transitions of display states included in each piece of slide data) at a glance.

Embodiment 3

Figure 7:
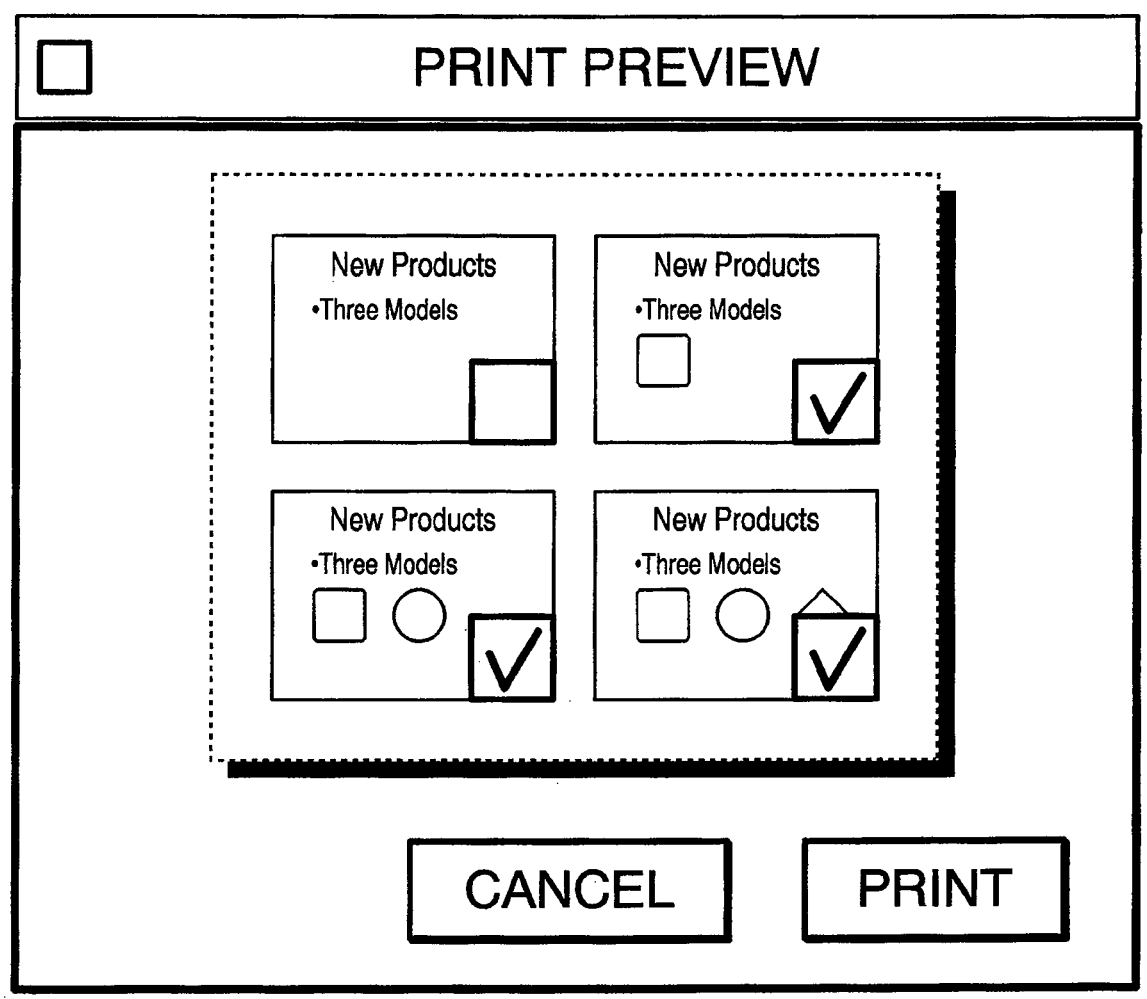
FIG. 7 is a schematic diagram showing an example of brief display (of the slide data representing the display state transitions of FIGS. 3A-3D on a display of the computer) implemented by a preview function of a printer driver in accordance with a third embodiment of the present invention.

A printer driver in accordance with a third embodiment of the present invention will be described below. As shown in FIG. 7, the printer driver of the third embodiment has a "preview function" of briefly displaying multiple pieces of display data at once and a "selection function" of letting the user select display data to be printed out from the multiple pieces of display data briefly displayed by the preview function.

Figure 8:
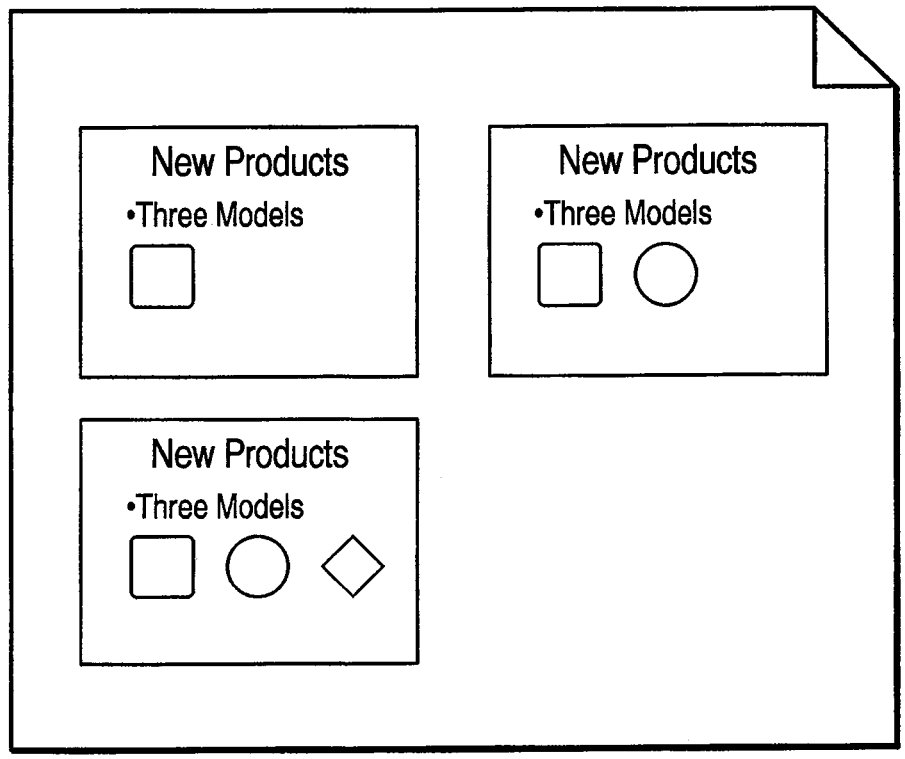
FIG. 8 is a schematic diagram showing an example of a printout of display data selected by the user from multiple pieces of display data briefly displayed by the preview function.
Figure 9:
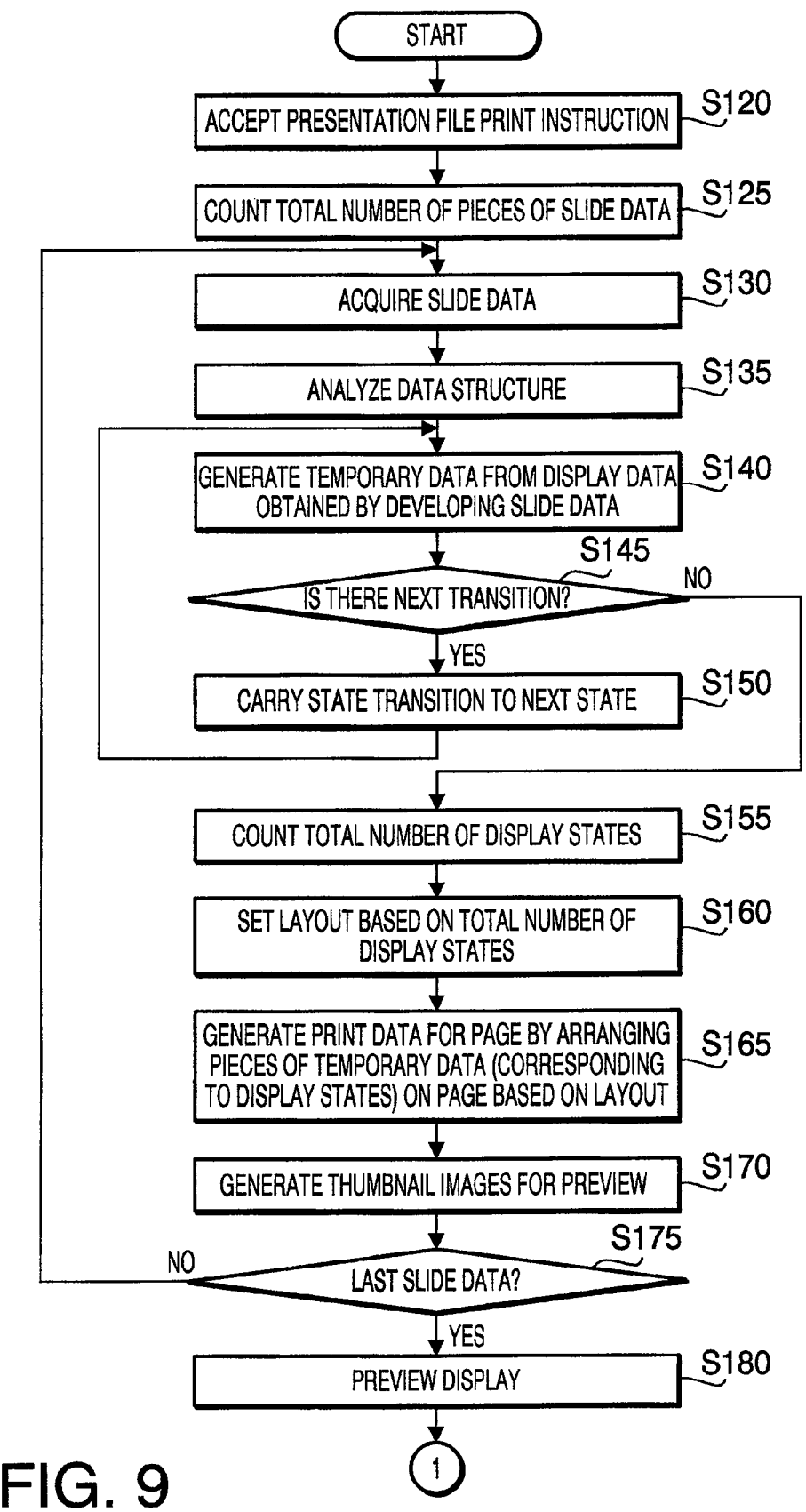
FIGS. 9 and 10 are flowcharts showing control by the printer driver of the third embodiment.
Figure 10:
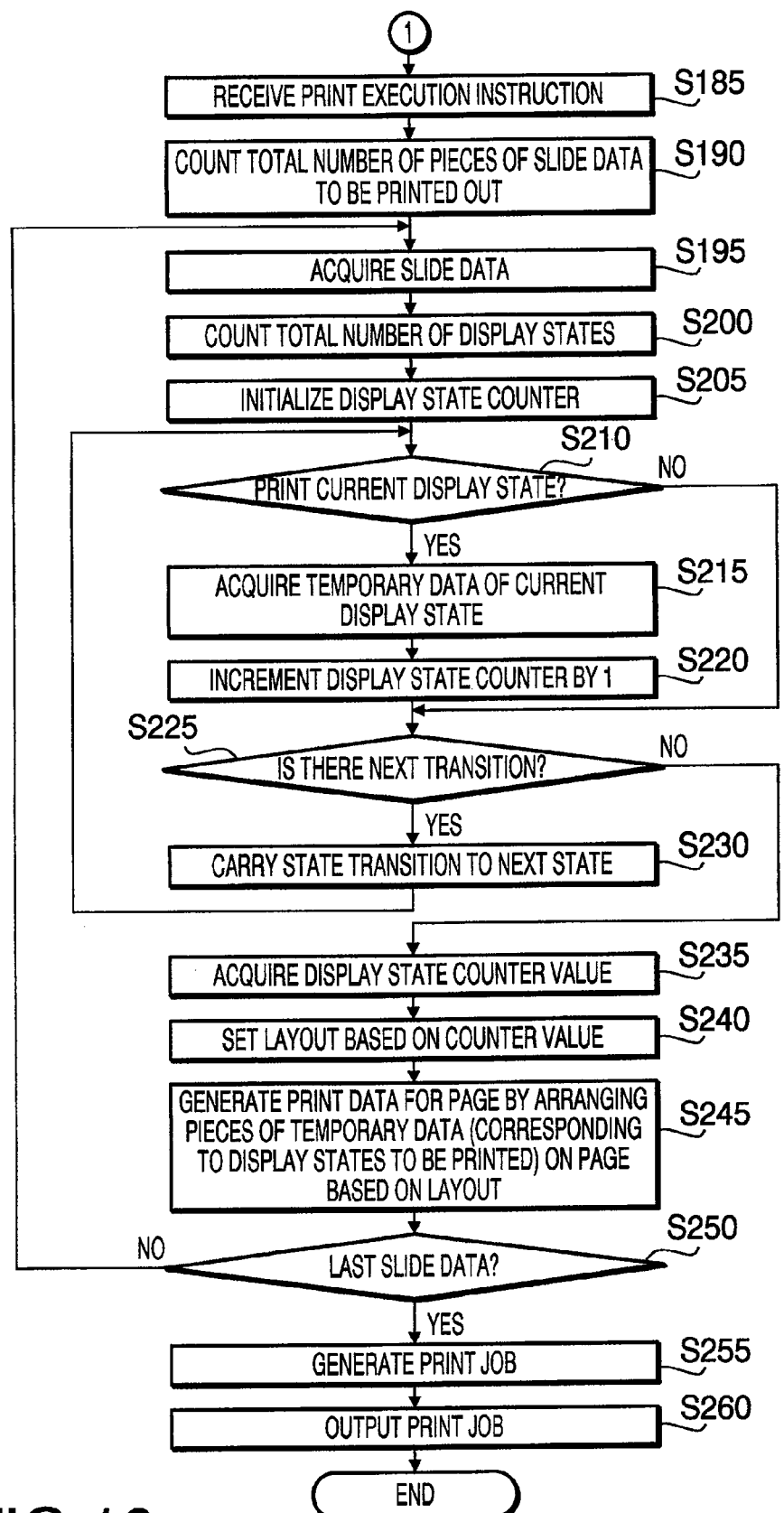
Figure 11:
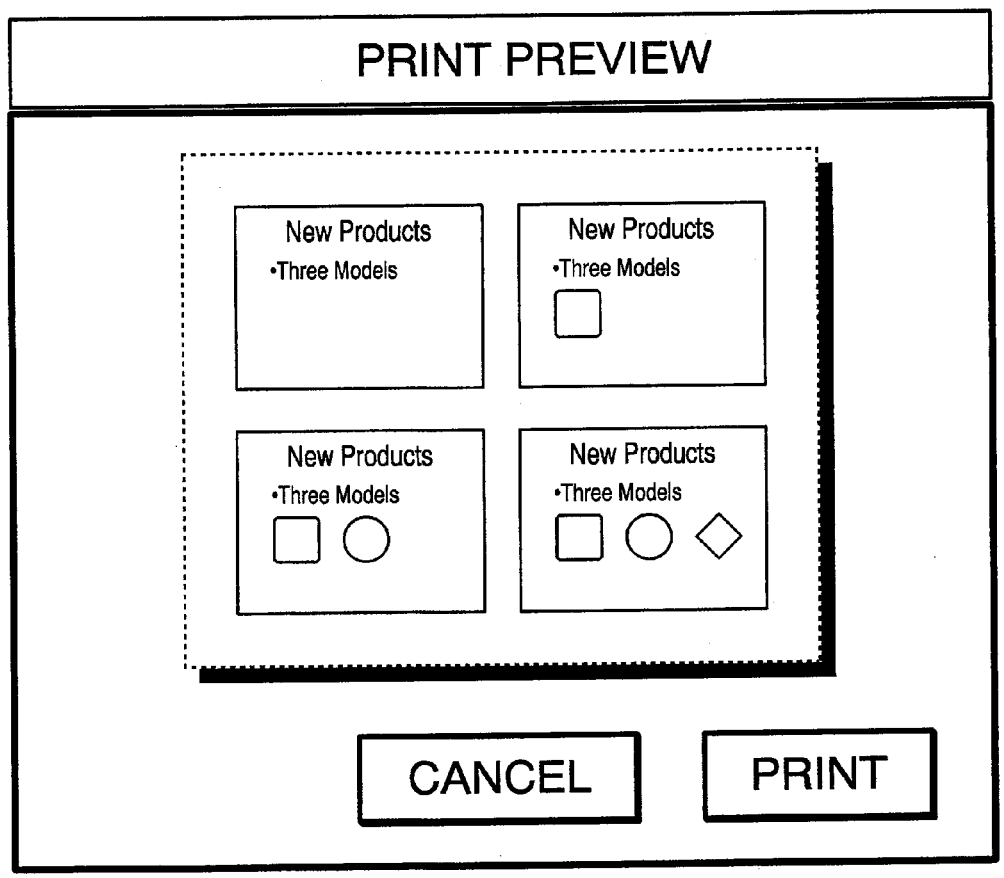
FIG. 11 is a schematic diagram showing a modification of the third embodiment.

FIG. 7 is a schematic diagram showing an example of the brief display (of the slide data representing the display state transitions of FIGS. 3A-3D on the display 17) implemented by the printer driver of the third embodiment. FIG. 8 is a schematic diagram showing an example of a printout of display data selected by the user from the multiple pieces of display data briefly displayed by the preview function. FIGS. 9 and 10 are flowcharts showing control by the printer driver of the third embodiment. FIG. 11 is a schematic diagram showing a modification of the third embodiment.

In the following, characteristic operation of the printer driver of the third embodiment will be described referring to FIGS. 9 and 10.

The printer driver implementing the process shown in FIGS. 9 and 10 is activated by the CPU 11 when a print instruction is issued by the user by operating the keyboard 15 or the pointing device 16. First, the CPU 11 executing the printer driver accepts the instruction for printing a presentation file (S120) and counts the total number of pieces of slide data included in the presentation file (S125).

After counting the total number of pieces of slide data (S125), the CPU 11 acquires one of the counted pieces of slide data (S130), analyzes the structure of the acquired slide data (S135), and generates temporary data for printing by developing the slide data into display data representing each display state corresponding to (after) each transition (S140).

Subsequently, the CPU 11 judges whether there exists the next transition (next display state) or not (S145). If there exists the next transition (S145: YES), the CPU 11 carries the state transition to the next state (S150) and returns to the step S140 to generate the next piece of temporary data from the display data representing the next display state.

On the other hand, if there exists no next transition (S145: NO), the CPU 11 counts the number of display states included in the current slide data (S155) and sets the layout of the pieces of temporary data on a page based on the counted number of display states (S160).

Subsequently, the CPU 11 generates print data for a page by arranging the pieces of temporary data (corresponding to the display states) on the page based on the layout set in S160 (S165) and generates thumbnail images for preview based on the generated print data (S170). The thumbnail images mean images that have been reduced (scaled down) in order to display a plurality of images in list display.

Subsequently, the CPU 11 judges whether the currently developed slide data is the last slide data or not (S175). If not the last slide data (S175: NO), the CPU 11 returns to the step S130 to repeat the steps S130-S170 for the next piece of slide data.

If the currently developed slide data is the last slide data in S175 (S175: YES), the CPU 11 displays the thumbnail images for preview, which have been generated in S170, on the display 17 (S180) and receives the user's selection from the thumbnail images in regard to which piece(s) of display data should be printed out (S185).

In this embodiment, each piece of display data selected by the user with the pointer 16 and thereby marked with the check mark as shown in FIG. 7 is recognized as data that should be printed out.

Subsequently, the CPU 11 counts the number of pieces of slide data to be printed out (S190), acquires one of the pieces of slide data counted in S190 (S195), counts the total number of display states in regard to the acquired piece of slide data (S200), and initializes a display state counter (S205). The display state counter is a counter used for counting the number of pieces of display data that should be printed out.

Subsequently, the CPU 11 judges whether the current display state (current display data) should be printed out or not based on the information (user's selection) received in S185 (S210). If the current display state should be printed out (S210:YES), the CPU 11 acquires one of the pieces of temporary data (generated in S140) that represents the current display state (S215) and thereafter increments the display state counter by 1 (S220).

Subsequently, the CPU 11 judges whether there exists the next transition (next display state) or not (S225). If there exists the next transition (S225:YES), the CPU 11 carries the state transition to the next state (S230) and returns to the step S210 to judge whether the next display state (next display data) should be printed out or not.

If the current display state should not be printed out in S210 (S210: NO), the CPU 11 advances to the step S225 judgment on whether there exists the next transition) without executing the step S215 (acquisition of the temporary data) or the step S220 (incrementation of the display state counter).

If there exists no next transition in S225 (S225: NO), the CPU 11 acquires the current value of the display state counter (S235) and sets the layout of the pieces of temporary data on a page based on the acquired current value of the display state counter (i.e. the number of pieces of display data to be printed out in regard to the current slide data) (S240).

Subsequently, the CPU 11 generates print data for a page by arranging the pieces of temporary data (corresponding to the display states that should be printed out) on the page based on the layout set in S240 (S245) and thereafter judges whether the currently developed slide data is the last slide data (in the pieces of slide data to be printed out) or not (S250).

If not the last slide data (S250: NO), the CPU 11 returns to the step S195 to repeat the steps S195-S245 for the next piece of slide data to be printed out. If the currently developed slide data is the last slide data (S250: YES), the CPU 11 generates a print job based on the print data generated in S245 (S255) and outputs the generated print job to the printer 20 (S260).

As described above, the printer driver of the third embodiment has the preview function of briefly displaying multiple pieces of display data at once, by which the user is allowed to grasp the display state transitions prior to the execution of the printing.

Further, thanks to the selection function letting the user select display data to be printed out from the preview display (multiple pieces of display data briefly displayed by the preview function), unnecessary printing of unintended display data can be prevented.

Incidentally, while multiple pieces of display data regarding a piece of slide data are printed on a sheet as shown in FIG. 8 in this embodiment, the printer driver of this embodiment is not to be restricted to such "list printing"; the printer driver may also be designed to print a piece of display data on a sheet like the printer driver of the first embodiment.

While the selection function of the printer driver of this embodiment lets the user select display data to be printed out from the multiple pieces of display data displayed in the preview display (regarding a piece of slide data), the selection function is not to be restricted to this type of selection. For example, it is also possible to leave out the sequence from S185 and just let the user select whether or not to print all the pieces of display data displayed in the preview display, as shown in FIG. 11.

Embodiment 4

Figure 12:
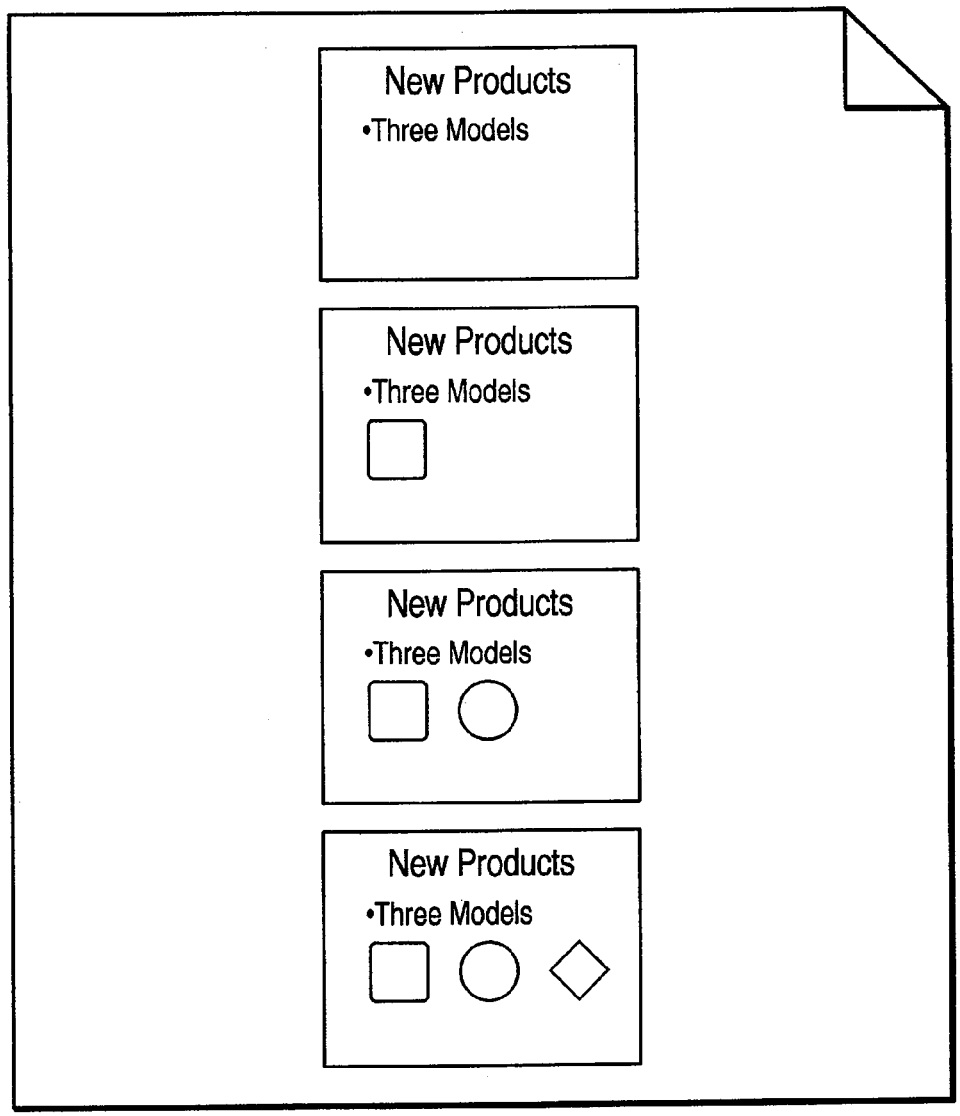
FIG. 12 is a schematic diagram showing an example of a printout (of the slide data representing the display state transitions of FIGS. 3A-3D) obtained by use of a printer driver in accordance with a fourth embodiment of the present invention.

A printer driver in accordance with a fourth embodiment of the present invention will be described below. As shown in FIG. 12, the printer driver of the fourth embodiment generates print data in which multiple pieces of display data are arranged in one direction in the order of transitions.

Figure 13:
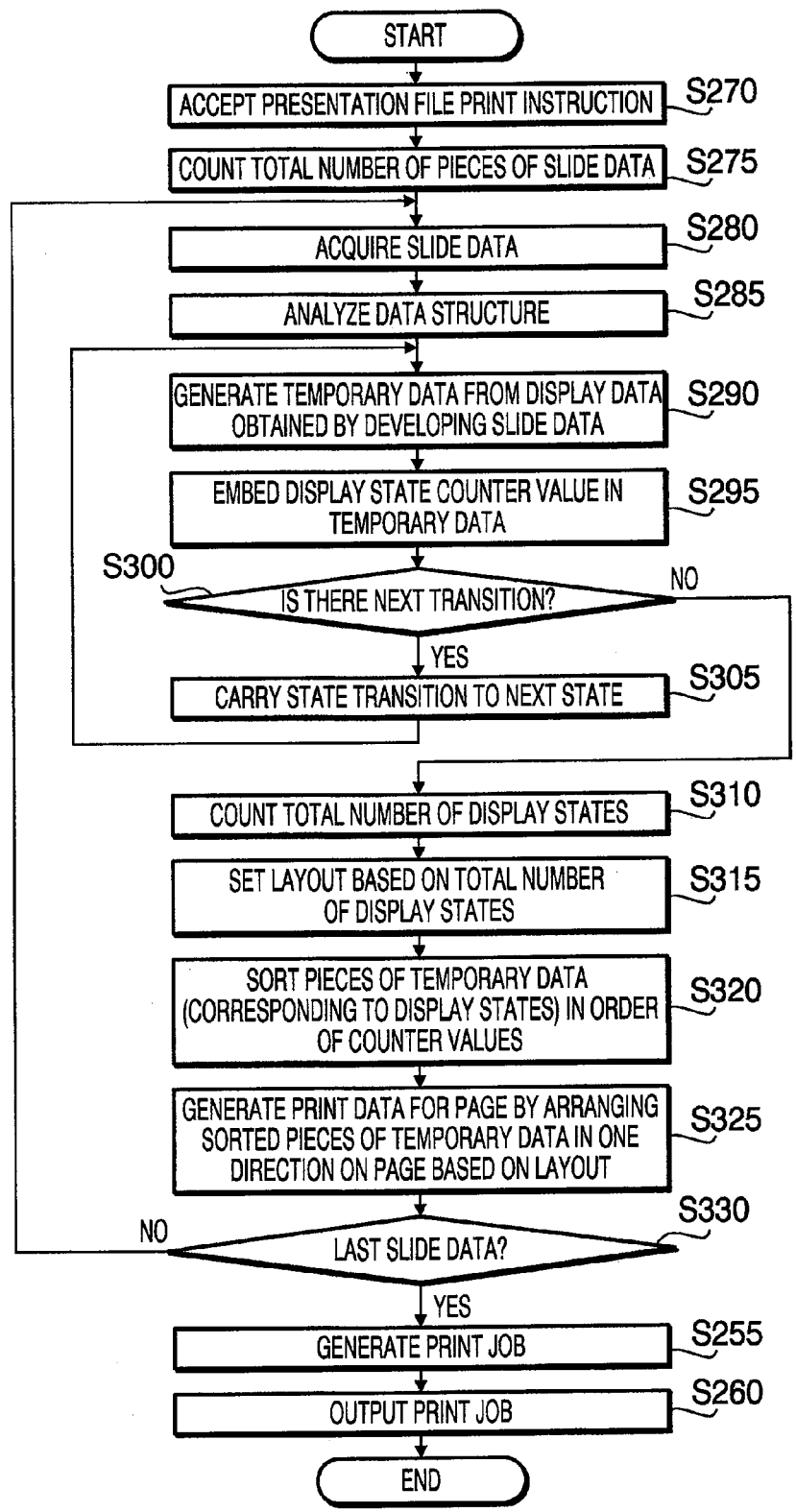
FIG. 13 is a flowchart showing control by the printer driver of the fourth embodiment.

FIG. 12 is a schematic diagram showing an example of a printout (of the slide data representing the display state transitions of FIGS. 3A-3D) obtained by use of the printer driver of the fourth embodiment. FIG. 13 is a flowchart showing control by the printer driver of the fourth embodiment.

In the following, characteristic operation of the printer driver of the fourth embodiment will be described referring to FIG. 13.

The printer driver implementing the process shown in FIG. 13 is activated by the CPU 11 when a print instruction is issued by the user by operating the keyboard 15 or the pointing device 16. First, the CPU 11 executing the printer driver accepts the instruction for printing a presentation file (S270) and counts the total number of pieces of slide data included in the presentation file (S275).

After counting the total number of pieces of slide data (S275), the CPU 11 acquires one of the counted pieces of slide data (S280), analyzes the structure of the acquired slide data (S285), generates temporary data for printing by developing the slide data into display data representing each display state corresponding to each transition (S290), and adds a counter value (indicating the number of display states which has been counted so far) to the temporary data (S295).

Subsequently, the CPU 11 judges whether there exists the next transition (next display state) or not (S300). If there exists the next transition (S300:YES), the CPU 11 carries the state transition to the next state (S305) and returns to the step S290 to generate the next piece of temporary data corresponding to the next display state.

On the other hand, if there exists no next transition (S300: NO), the CPU 11 counts (recognizes) the total number of display states in regard to the current slide data based on the counter value (S310) and sets the layout of the pieces of temporary data on a page based on the counted total number of display states (S315).

Subsequently, the CPU 11 generates print data for a page by sorting the pieces of temporary data (corresponding to the display states) in order of the counter values which have been added thereto (S320) and arranging (aligning) the sorted pieces of temporary data in one direction on the page based on the layout set in S315 (S325).

Subsequently, the CPU 11 judges whether the currently developed slide data is the last slide data or not (S330). If not the last slide data (S330: NO), the CPU 11 returns to the step S280 to repeat the steps S280-S325 for the next piece of slide data.

If the currently developed slide data is the last slide data (S330: YES), the CPU 11 generates a print job based on the print data generated in S325 (S335) and outputs the generated print job to the printer 20 (S340).

As described above, the printer driver of the fourth embodiment generates print data in which multiple pieces of print data are arranged in one direction in the order of transitions (S320, S325). Therefore, the user viewing the printout of the print data can grasp the display state transitions with greater ease.

Embodiment 5

Figure 14:
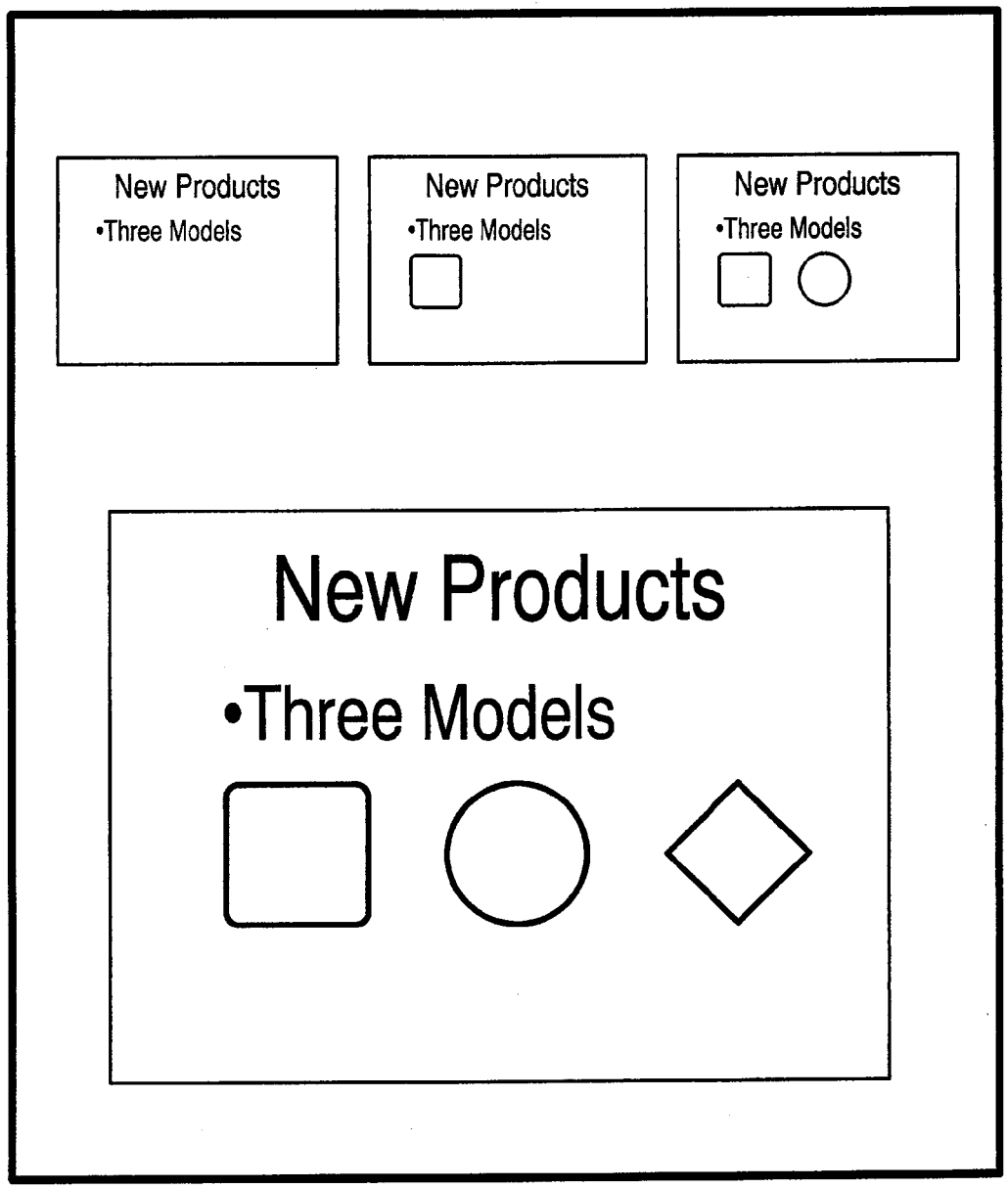
FIG. 14 is a schematic diagram showing an example of a printout (of the slide data representing the display state transitions of FIGS. 3A-3D) obtained by use of a printer driver in accordance with a fifth embodiment of the present invention.

A printer driver in accordance with a fifth embodiment of the present invention will be described below. As shown in FIG. 14, the printer driver of the fifth embodiment lets the user set the size of each piece of display data printed on a sheet.

Figure 15:
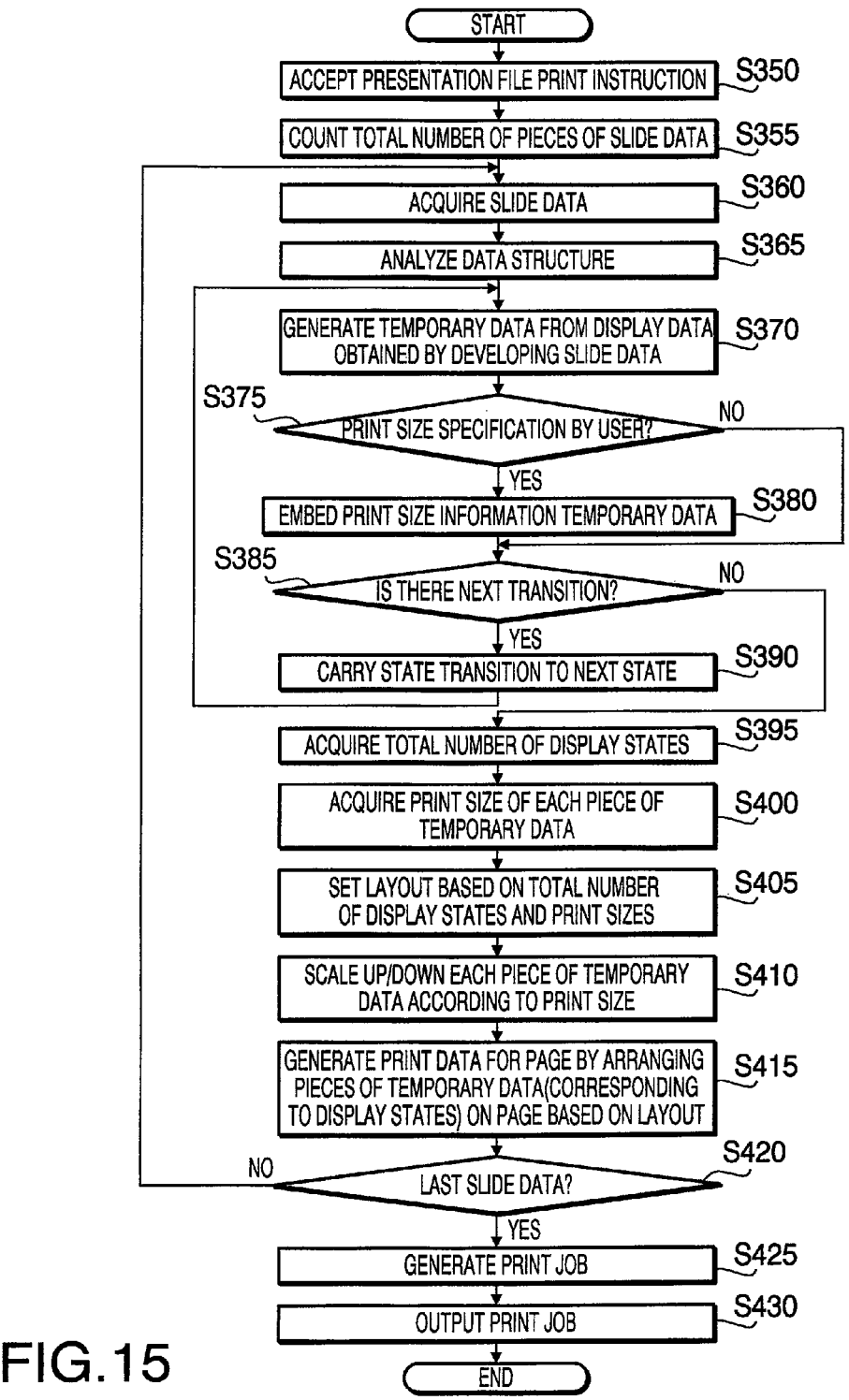
FIG. 15 is a flowchart showing control by the printer driver of the fifth embodiment.

FIG. 14 is a schematic diagram showing an example of a printout (of the slide data representing the display state transitions of FIGS. 3A-3D) obtained by use of the printer driver of the fifth embodiment. FIG. 15 is a flowchart showing control by the printer driver of the fifth embodiment.

In the following, characteristic operation of the printer driver of the fifth embodiment will be described referring to FIG. 15.

The printer driver implementing the process shown in FIG. 15 is activated by the CPU 11 when a print instruction is issued by the user by operating the keyboard 15 or the pointing device 16. First, the CPU 11 executing the printer driver accepts the instruction for printing a presentation file (S350) and counts the total number of pieces of slide data included in the presentation file (S355).

After counting the total number of pieces of slide data (S355), the CPU 11 acquires one of the counted pieces of slide data (S360), analyzes the structure of the acquired slide data (S365), and generates temporary data for printing by developing the slide data into display data representing each display state corresponding to each transition (S370).

Subsequently, the CPU 11 judges whether the size of the temporary data (display data) printed on the sheet (print size) has been specified (set) by the user (S375).

Incidentally, the print size of each piece of display state can be specified by the user as needed, by operating the keyboard 15, the pointer (mouse) 16, etc.

If the print size has been specified by the user (S375: YES), the CPU 11 adds information indicating the print size (print size information) to the temporary data (S380) and thereafter judges whether there exists the next transition (next display state) or not (S385).

On the other hand, if the print size has not been specified by the user (S375: NO), the CPU 11 advances to the step S385 without adding the print size information to the temporary data.

If there exists the next transition in S385 (S385: YES), the CPU 11 carries the state transition to the next state (S390) and returns to the step S370 to generate the next piece of temporary data corresponding to the next display state.

On the other hand, if there exists no next transition (S385: NO), the CPU 11 acquires the total number of display states in regard to the current slide data and the print size of each piece of temporary data (S395, S400) and sets the layout of the pieces of temporary data on a page based on the total number of display states and the print sizes acquired in S395 and S400 (S405).

Subsequently, the CPU 11 generates print data for a page by enlarging/reducing (scaling up/down) each piece of temporary data according to the acquired print size (S410) and arranging the enlarged/reduced pieces of temporary data on the page based on the layout set in S405 (S415).

Subsequently, the CPU 11 judges whether the currently developed slide data is the last slide data or not (S420). If not the last slide data (S420: NO), the CPU 11 returns to the step S360 to repeat the steps S360-S415 for the next piece of slide data.

If the currently developed slide data is the last slide data (S420: YES), the CPU 11 generates a print job based on the print data generated in S415 (S425) and outputs the generated print job to the printer 20 (S430).

As described above, the printer driver of the fifth embodiment implements the printing of multiple pieces of display data on a sheet while also changing the print size of each piece of display data according to the user's intention, by which greater convenience is realized.

Embodiment 6

A printer driver in accordance with a sixth embodiment of the present invention will be described below. The printer driver of the sixth embodiment sets the print size of at least one selected from the display data representing the first display state and the display data representing the last display state at a size different from (larger than, in this embodiment) that of the other pieces of display data according to the intention of the user.

Figure 16:
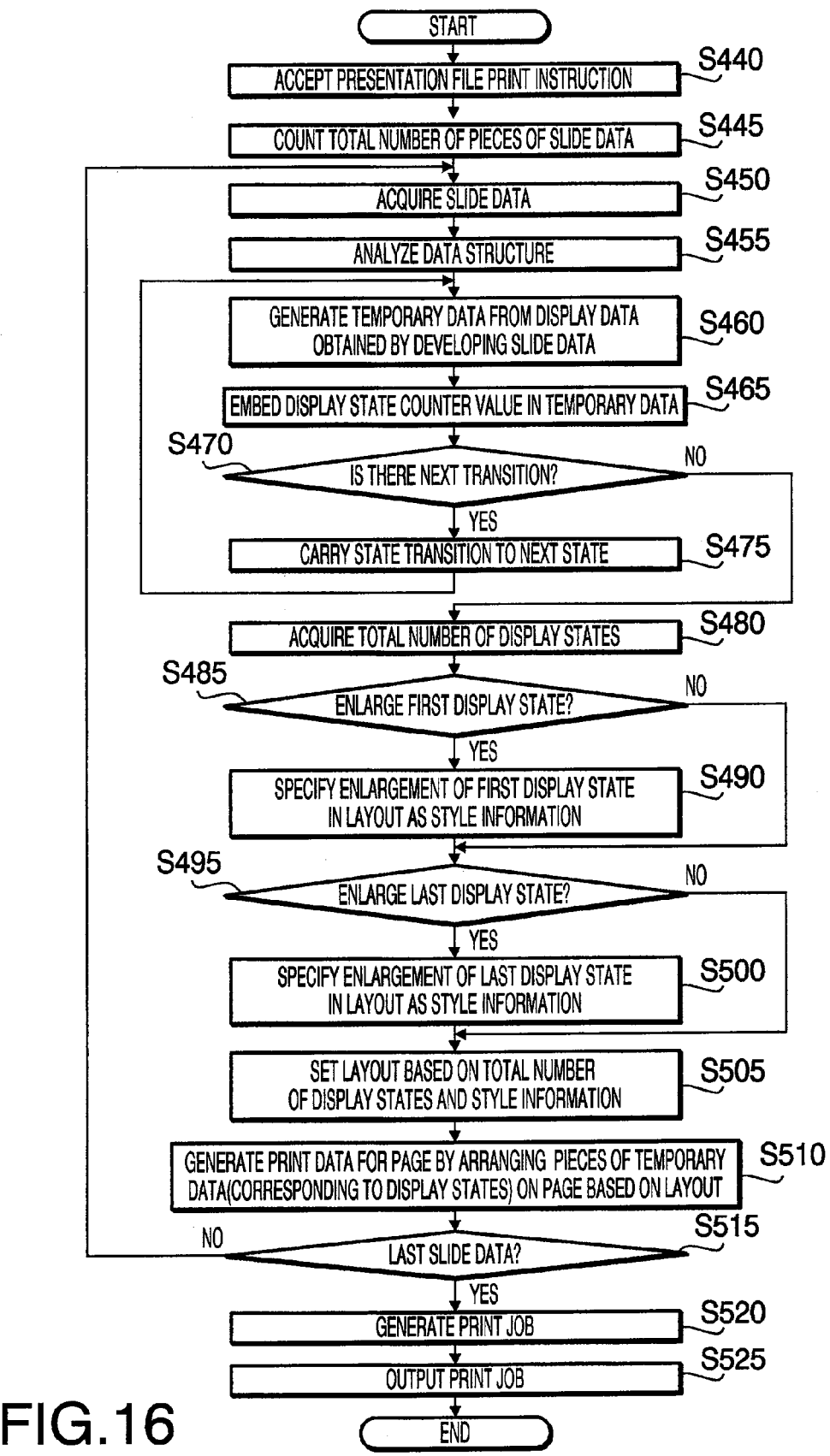
FIG. 16 is a flowchart showing control by a printer driver in accordance with a sixth embodiment of the present invention.

In the following, characteristic operation of the printer driver of the sixth embodiment will be described referring to FIG. 16. FIG. 16 is a flowchart showing control by the printer driver of the sixth embodiment.

The printer driver implementing the process shown in FIG. 16 is activated by the CPU 11 when a print instruction is issued by the user by operating the keyboard 15 or the pointing device 16. First, the CPU 11 executing the printer driver accepts the instruction for printing a presentation file (S440) and counts the total number of pieces of slide data included in the presentation file (S445).

After counting the total number of pieces of slide data (S445), the CPU 11 acquires one of the counted pieces of slide data (S450), analyzes the structure of the acquired slide data (S455), generates temporary data for printing by developing the slide data into display data representing each display state corresponding to each transition (S460), and adds a counter value (for the identification of the temporary data (display state)) to the temporary data (S465).

Subsequently, the CPU 11 judges whether there exists the next transition (next display state) or not (S470). If there exists the next transition (S470: YES), the CPU 11 carries the state transition to the next state (S475) and returns to the step S460 to generate the next piece of temporary data corresponding to the next display state.

On the other hand, if there exists no next transition (S470: NO), the CPU 11 acquires the total number of display states in regard to the current slide data (S480) and thereafter inquires of the user whether the first display state (temporary data having the smallest counter value) should be printed in a larger size than other display states (other pieces of temporary data) (S485).

If the user specifies that the first display state should be printed in a larger size (S485: YES), the CPU 11 specifies enlargement (larger size) of the first display state as style information to be used for setting the print layout (S490) and thereafter advances to step S495.

If the user does not specify that the first display state should be printed in a larger size (S485: NO), the CPU 11 advances to the step S495 while skipping S490. In the step S495, the CPU 11 inquires of the user whether the last display state (temporary data having the largest counter value) should be printed in a larger size than other display states (other pieces of temporary data).

If the user specifies that the last display state should be printed in a larger size (S495: YES), the CPU 11 specifies enlargement (larger size) of the last display state as style information to be used for setting the print layout (S500) and thereafter advances to step S505.

If the user does not specify that the last display state should be printed in a larger size (S495: NO), the CPU 11 advances to the step S505 while skipping S500. In the step S505, the CPU 11 sets the layout of the pieces of temporary data on a page based on the total number of display states acquired in S480 and the print sizes specified in S485-S500.

Subsequently, the CPU 11 generates print data for a page by arranging the pieces of temporary data (corresponding to the display states) on the page based on the layout set in S505 (S510).

Subsequently, the CPU 11 judges whether the currently developed slide data is the last slide data or not (S515). If not the last slide data (S515:NO), the CPU 11 returns to the step S450 to repeat the steps S450-S510 for the next piece of slide data.

If the currently developed slide data is the last slide data (S515: YES), the CPU 11 generates a print job based on the print data generated in S510 (S520) and outputs the generated print job to the printer 20 (S525).

As described above, the printer driver of the sixth embodiment sets the print size of the display data representing the first display state and/or the display data representing the last display state at a size different from that of other pieces of display data (according to the intention of the user). Therefore, the user viewing the display state printed in the different size (the first display state or the last display state) can easily discriminate it from other display states (intermediate display states), that is, easily recognize that the display state is the first display state or the last display state at a glance.

Embodiment 7

Figure 17:
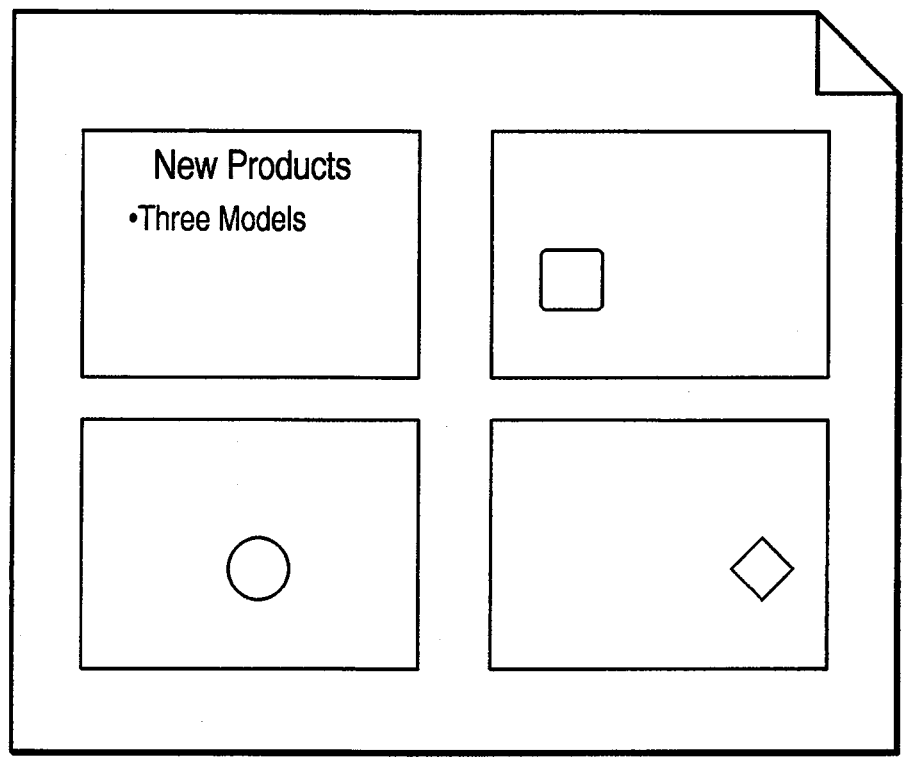
FIG. 17 is a schematic diagram showing an example of a printout (of the slide data representing the display state transitions of FIGS. 3A-3D) obtained by use of a printer driver in accordance with a seventh embodiment of the present invention.

A printer driver in accordance with a seventh embodiment of the present invention will be described below. As shown in FIG. 17, the printer driver of the seventh embodiment generates the print data so that only display contents (contents of information displayed on the display/screen) changing in each transition (selected from all the display contents of each piece of display data) are printed.

Figure 18:
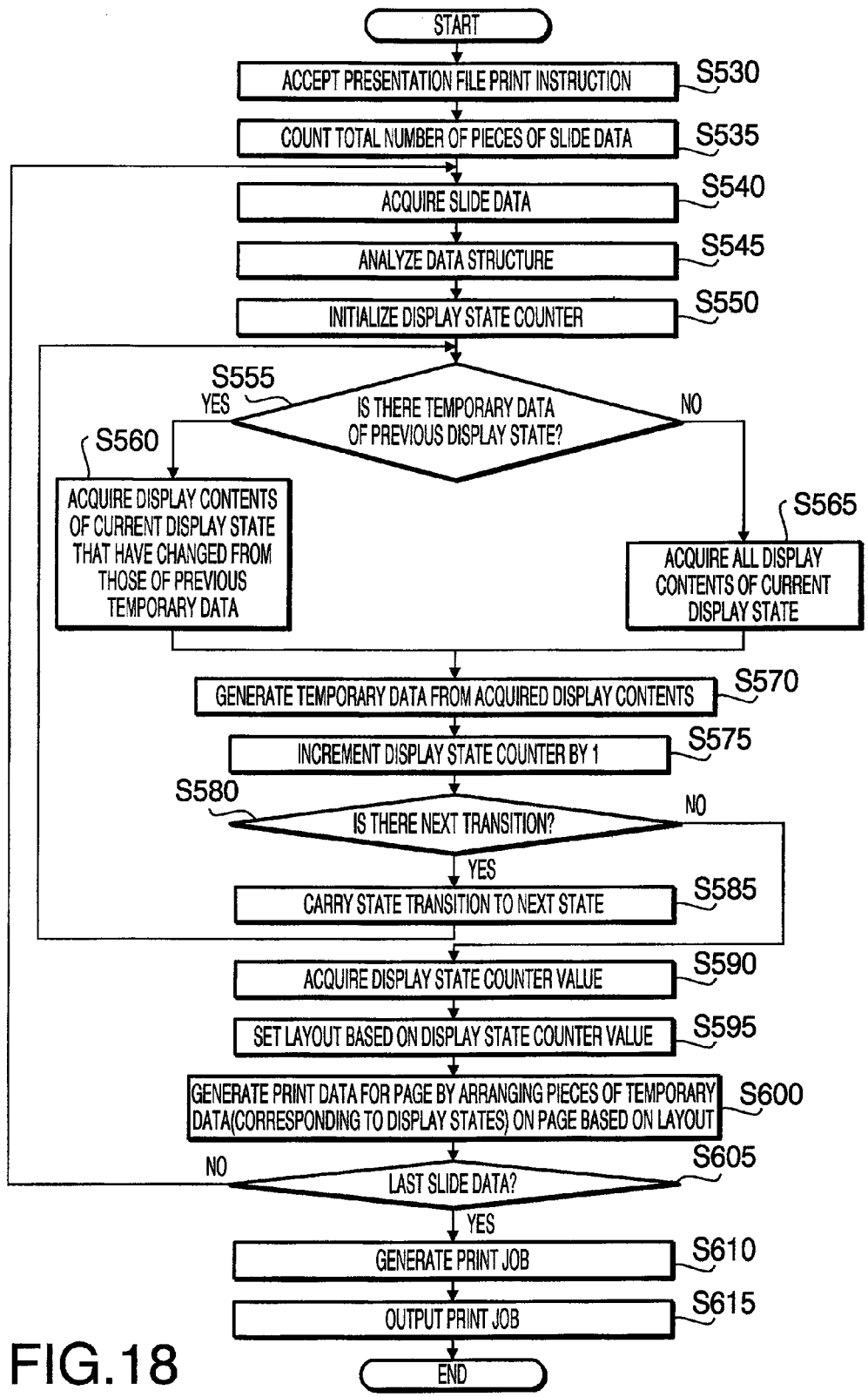
FIG. 18 is a flowchart showing control by the printer driver of the seventh embodiment.

FIG. 17 is a schematic diagram showing an example of a printout (of the slide data representing the display state transitions of FIGS. 3A-3D) obtained by use of the printer driver of the seventh embodiment. FIG. 18 is a flowchart showing control by the printer driver of the seventh embodiment.

In the following, characteristic operation of the printer driver of the seventh embodiment will be described referring to FIG. 18.

The printer driver implementing the process shown in FIG. 18 is activated by the CPU 11 when a print instruction is issued by the user by operating the keyboard 15 or the pointing device 16. First, the CPU 11 executing the printer driver accepts the instruction for printing a presentation file (S530) and counts the total number of pieces of slide data included in the presentation file (S535).

After counting the total number of pieces of slide data (S535), the CPU 11 acquires one of the counted pieces of slide data (S540), analyzes the structure of the acquired slide data (S545), and initializes a counter value indicating the number of display states (S550).

Subsequently, the CPU 11 judges whether there exists temporary data regarding the previous display state or not, that is, whether the display state currently being acquired is not the first display state (S555). If the current display state is the first display state (S555: NO), the CPU 11 acquires all the display contents (contents of information displayed) of the current display state (S565).

On the other hand, if not the first display state (S555: YES), the CPU 11 acquires only display contents of the current display state that have changed (that are different) from those of the previous display state (previous temporary data) (S560).

Subsequently, the CPU 11 generates temporary data for printing by use of the display contents acquired in S560 or S565 (S570), increments the counter value by 1 (S575), and judges whether there exists the next transition (next display state) or not (S580). If there exists the next transition (S580: YES), the CPU 11 carries the state transition to the next state (S585) and returns to the step S555.

If there exists no next transition in S580 (S580: NO), the CPU 11 acquires the counter value indicating the number of display states (S590) and sets the layout of the pieces of temporary data on a page based on the acquired number of display states (S595). Subsequently, the CPU 11 generates print data for a page by arranging the pieces of temporary data (corresponding to the display states) on the page based on the layout set in S595 (S600).

Subsequently, the CPU 11 judges whether the currently developed slide data is the last slide data or not (S605). If not the last slide data (S605: NO), the CPU 11 returns to the step S540 to repeat the steps S540-S600 for the next piece of slide data.

If the currently developed slide data is the last slide data (S605: YES), the CPU 11 generates a print job based on the print data generated in S600 (S610) and outputs the generated print job to the printer 20 (S615).

As described above, the printer driver of the seventh embodiment generates the print data so that only display contents changing in each transition (selected from all the display contents of each piece of display data) are printed (S555-S570), by which the user is allowed to grasp the details of the display state transitions at a glance.

Embodiment 8

Figure 19:
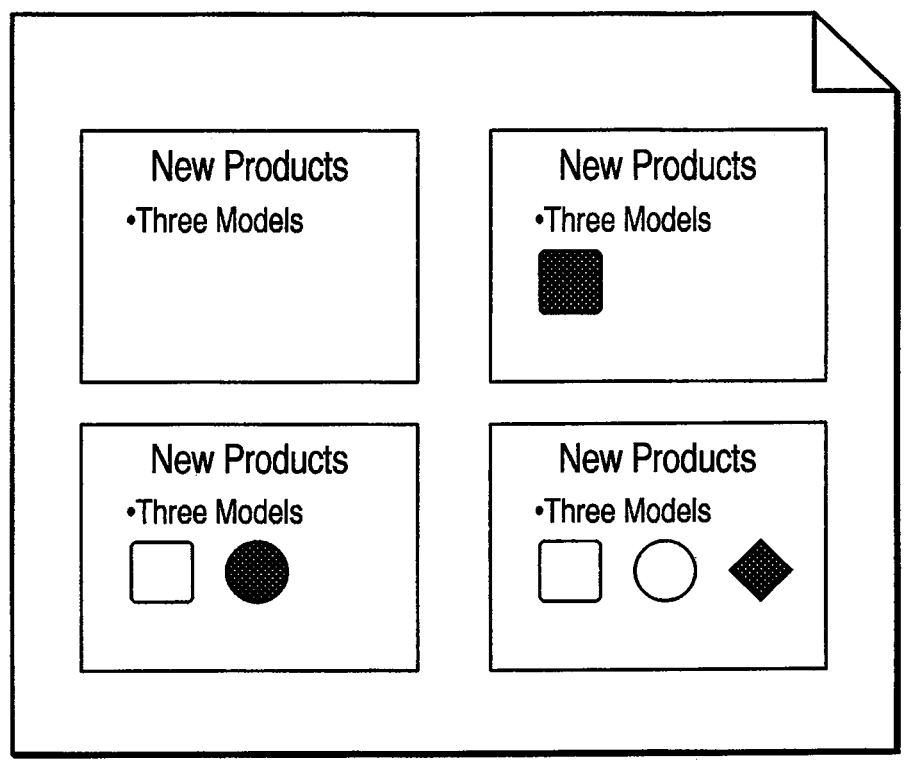
FIG. 19 is a schematic diagram showing an example of a printout (of the slide data representing the display state transitions of FIGS. 3A-3D) obtained by use of a printer driver in accordance with an eighth embodiment of the present invention.

A printer driver in accordance with an eighth embodiment of the present invention will be described below. As shown in FIG. 19, the printer driver of the eighth embodiment generates the print data so that display contents changing in each transition (selected from all the display contents of each piece of display data) are printed in an emphasized state in comparison with the other display contents.

Figure 20:
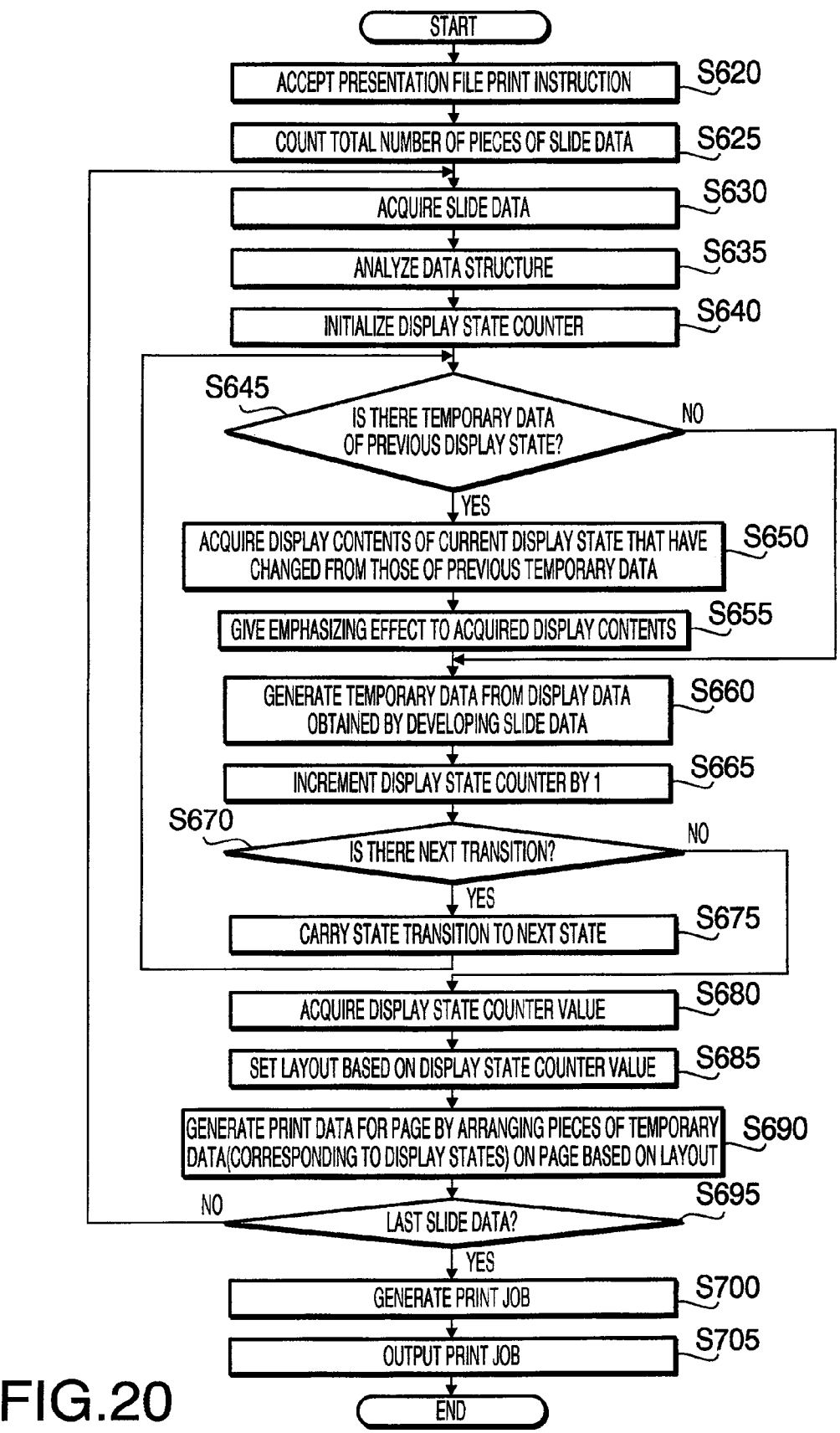
FIG. 20 is a flowchart showing control by the printer driver of the eighth embodiment.

FIG. 19 is a schematic diagram showing an example of a printout (of the slide data representing the display state transitions of FIGS. 3A-3D) obtained by use of the printer driver of the eighth embodiment. FIG. 20 is a flowchart showing control by the printer driver of the eighth embodiment.

In the following, characteristic operation of the printer driver of the eighth embodiment will be described referring to FIG. 20.

The printer driver implementing the process shown in FIG. 20 is activated by the CPU 11 when a print instruction is issued by the user by operating the keyboard 15 or the pointing device 16. First, the CPU 11 executing the printer driver accepts the instruction for printing a presentation file (S620) and counts the total number of pieces of slide data included in the presentation file (S625).

After counting the total number of pieces of slide data (S625), the CPU 11 acquires one of the counted pieces of slide data (S630), analyzes the structure of the acquired slide data (S635), and initializes a counter value indicating the number of display states (S640).

Subsequently, the CPU 11 judges whether there exists temporary data regarding the previous display state or not, that is, whether the display state currently being acquired is not the first display state (S645). If the current display state is not the first display state (S645: YES), the CPU 11 acquires only display contents of the current display state that have changed (that are different) from those of the previous display state (previous temporary data) (S650).

Subsequently, the CPU 11 gives an emphasizing effect to the display contents acquired in S650 so that the acquired display contents will be printed in an emphasized state in comparison with the other display contents (S655). The "emphasizing effect" can be any kind of effect as long as the particular display contents (i.e. the acquired display contents) are emphasized in comparison with the other display contents, such as changing the color, luminance, etc. of the particular display contents.

Subsequently, the CPU 11 generates temporary data for printing from the display data representing the current display state (obtained by the development of the slide data) to which the emphasizing effect (to the acquired display contents) has been given (S660). Incidentally, when the current display state is the first display state in S645 (S645: NO), the CPU 11 generates the temporary data for printing from the display data representing the current (first) display state (obtained by the development of the slide data), without giving any emphasizing effect (S660).

After generating the temporary data (S660), the CPU 11 increments the counter value by 1 (S665) and thereafter judges whether there exists the next transition (next display state) or not (S670). If there exists the next transition (S670: YES), the CPU 11 carries the state transition to the next state (S675) and returns to the step S645.

On the other hand, if there exists no next transition (S670: NO), the CPU 11 acquires the counter value indicating the number of display states (S680), sets the layout of the pieces of temporary data on a page based on the acquired number of display states (S685), and generates print data for a page by arranging the pieces of temporary data (corresponding to the display states) on the page based on the layout set in S685 (S690).

Subsequently, the CPU 11 judges whether the currently developed slide data is the last slide data or not (S695). If not the last slide data (S695: NO), the CPU 11 returns to the step S630 to repeat the steps S630-S690 for the next piece of slide data.

If the currently developed slide data is the last slide data (S695: YES), the CPU 11 generates a print job based on the print data generated in S690 (S700) and outputs the generated print job to the printer 20 (S705).

As described above, the printer driver of the eighth embodiment generates the print data so that display contents changing in each transition (selected from all the display contents of each piece of display data) are printed in an emphasized state in comparison with the other display contents (S645-S660), by which the user is allowed to grasp the details of the display state transitions at a glance.

Embodiment 9

A printer driver in accordance with a ninth embodiment of the present invention will be described below. As shown in FIG. 21, the printer driver of the ninth embodiment generates the print data so that display data of the largest print size (i.e. display data for which the largest print size has been specified among the multiple pieces of display data) and display data of the smallest print size (i.e. display data for which the smallest print size has been specified among the multiple pieces of display data) are printed on different pages.

Figure 21A:
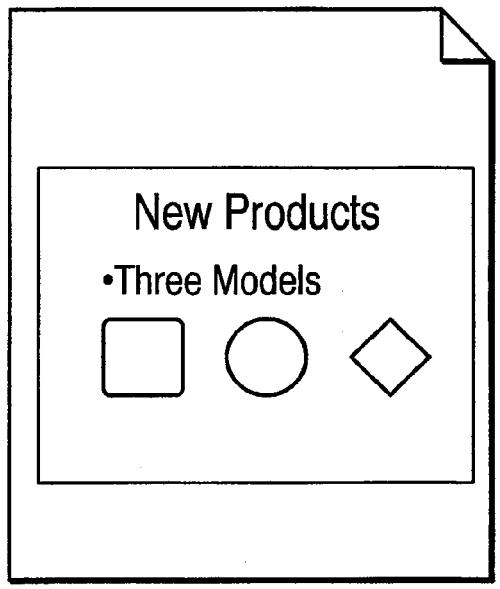
FIGS. 21A and 21B are schematic diagrams showing an example of a printout (of the slide data representing the display state transitions of FIGS. 3A-3D) obtained by use of a printer driver in accordance with a ninth embodiment of the present invention.
Figure 21B:
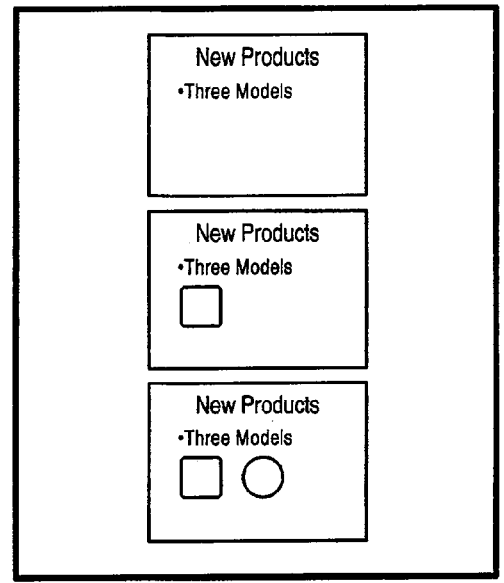
Figure 22:
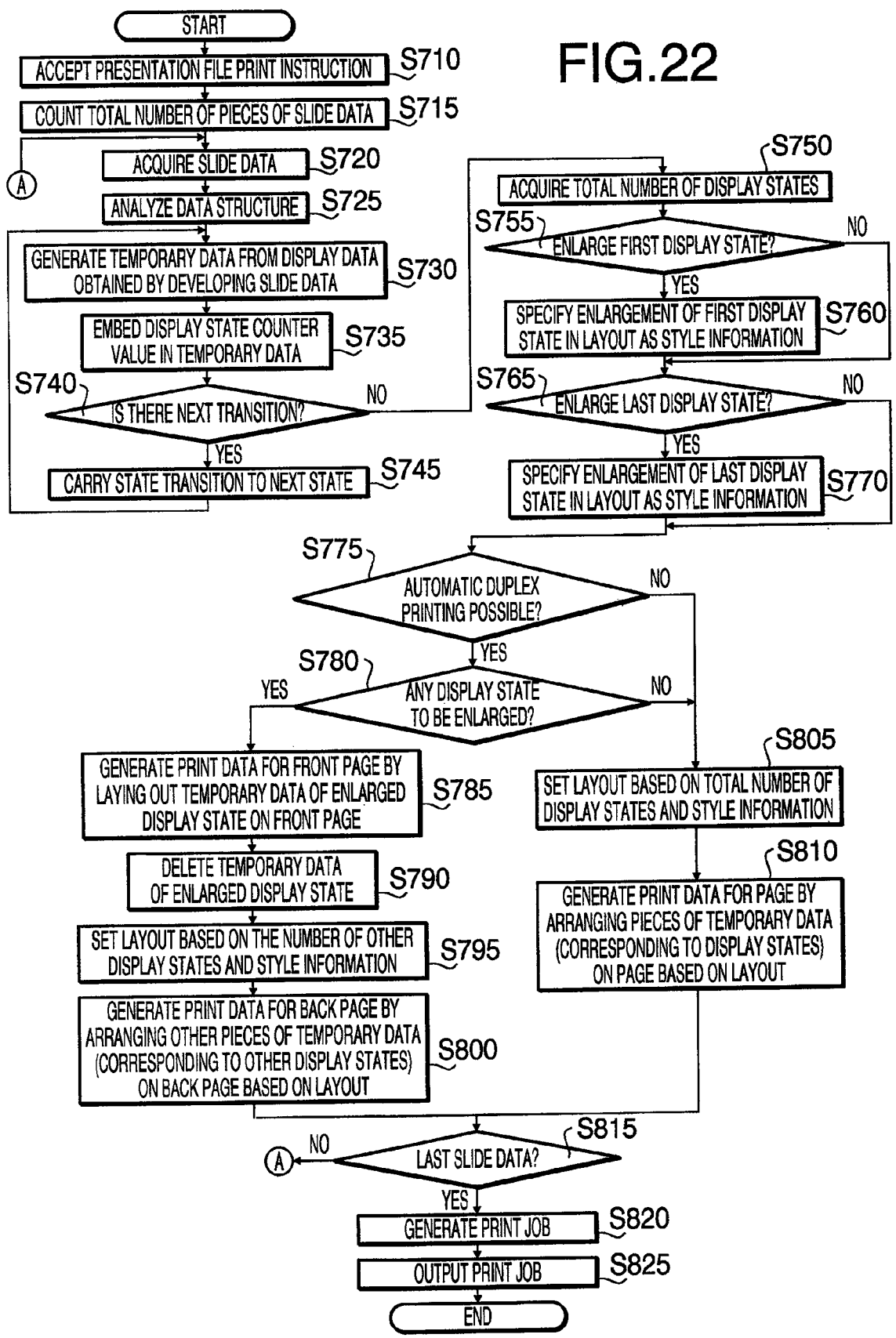
FIG. 22 is a flowchart showing control by the printer driver of the ninth embodiment.

FIGS. 21A and 21B are schematic diagrams showing an example of a printout (of the slide data representing the display state transitions of FIGS. 3A-3D) obtained by use of the printer driver of the ninth embodiment. FIG. 22 is a flowchart showing control by the printer driver of the ninth embodiment.

In the following, characteristic operation of the printer driver of the ninth embodiment will be described referring to FIG. 22.

The printer driver implementing the process shown in FIG. 22 is activated by the CPU 11 when a print instruction is issued by the user by operating the keyboard 15 or the pointing device 16. First, the CPU 11 executing the printer driver accepts the instruction for printing a presentation file (S710) and counts the total number of pieces of slide data included in the presentation file (S715).

After counting the total number of pieces of slide data (S715), the CPU 11 acquires one of the counted pieces of slide data (S720), analyzes the structure of the acquired slide data (S725), generates temporary data for printing by developing the slide data into display data representing each display state corresponding to each transition (S730), and adds a counter value (for the identification of the temporary data (display state)) to the temporary data (S735).

Subsequently, the CPU 11 judges whether there exists the next transition (next display state) or not (S740). If there exists the next transition (S740: YES), the CPU 11 carries the state transition to the next state (S745) and returns to the step S730 to generate the next piece of temporary data corresponding to the next display state.

On the other hand, if there exists no next transition (S740: NO), the CPU 11 acquires the total number of display states in regard to the current slide data (S750) and thereafter inquires of the user whether the first display state (temporary data having the smallest counter value for the identification) should be printed in a larger size than other display states (other pieces of temporary data) (S755).

If the user specifies that the first display state should be printed in a larger size (S755: YES), the CPU 11 specifies enlargement (larger size) of the first display state as style information to be used for setting the print layout (S760) and thereafter advances to step S765.

If the user does not specify that the first display state should be printed in a larger size (S755:NO), the CPU 11 advances to the step S765 while skipping S760. In the step S765, the CPU 11 inquires of the user whether the last display state (temporary data having the largest counter value for the identification) should be printed in a larger size than other display states (other pieces of temporary data).

If the user specifies that the last display state should be printed in a larger size (S765: YES), the CPU 11 specifies enlargement (larger size) of the last display state as style information to be used for setting the print layout (S770) and thereafter advances to step S775.

If the user does not specify that the last display state should be printed in a larger size (S765:NO), the CPU 11 advances to the step S775 while skipping S770. In the step S775, the CPU 11 judges whether or not the available printer 20 is capable of automatic duplex printing.

If the printer 20 is capable of automatic duplex printing (S775: YES), the CPU 11 judges whether there exists a piece of temporary data that should be printed in the larger size (the first display state, the last display state or none in this embodiment) (S780).

If there exists a piece of temporary data that should be printed in the larger size (S780: YES), the CPU 11 generates print data for the front page (front side of a sheet) so that only the temporary data that should be printed in the larger size will be printed on the front side (S785) and thereafter deletes the temporary data (S790).

Subsequently, the CPU 11 sets the layout of the other pieces of temporary data (other than the deleted temporary data to be printed in the larger size) on the back page (back side of the sheet) based on the number of display states corresponding to the other pieces of temporary data and the style information (S795), generates print data for the back page (back side) by arranging the other pieces of temporary data (corresponding to the display states) on the back page based on the layout set in S795 (S800), and thereafter advances to step S815.

On the other hand, if the printer 20 is incapable of automatic duplex printing in S775 (S775: NO) or if there exists no piece of temporary data that should be printed in the larger size in S780 (S780: NO), the CPU 11 sets the layout of all pieces of temporary data on a page based on the total number of display states acquired in S750 (S805), generates print data for a page by arranging the pieces of temporary data (corresponding to the display states) on the page based on the layout set in S805 (S810), and thereafter advances to the step S815.

In the step S815, the CPU 11 judges whether the currently developed slide data is the last slide data or not. If not the last slide data (S815: NO), the CPU 11 returns to the step S720 to repeat the steps S720-S810 for the next piece of slide data.

If the currently developed slide data is the last slide data (S815: YES), the CPU 11 generates a print job based on the print data generated in S800 and/or S810 (S820) and outputs the generated print job to the printer 20 (S825).

As described above, with the printer driver of the ninth embodiment, display data of the largest print size can be printed on one side (front side in this embodiment) of a sheet while printing display data of the other print sizes (small sizes) on the other side (back side in this embodiment) of the sheet (S720-S810), by which the discrimination between the display data of the largest print size and the display data of the smallest print size (or the other print sizes) by the user is facilitated.

Incidentally, while the largest display data (display data of the largest print size) and the other display data (display data of the other print sizes) are printed on different sides of a sheet (as different pages) when the automatic duplex printing is supported by the printer 20 in this embodiment, it is also possible to print the largest display data and the other display data on different sheets (as different pages) when the automatic duplex printing is not supported by the printer 20.

While the print size is variable only for the display data representing the first display state and the display data representing the last display state in the flowchart of FIG. 22, this embodiment is not to be restricted to the flow. For example, it is possible to print specified piece of display data (representing a display state specified by the user) on a different page than display data representing the other display states.

Embodiment 10

A printer driver in accordance with a tenth embodiment of the present invention will be described below. FIGS. 23A-23E are schematic diagrams showing another example of display state transitions of slide data created by use of presentation document creation software. In the transition between the display states of FIGS. 23B and 23C (in which only the size and thickness of characters change), the contents of information (information contents) obtained by the user do not change substantially. As shown in FIG. 24, the printer driver of the tenth embodiment generates the print data so that only display data representing display states corresponding to substantial change in the information contents obtained by the user are printed, without outputting display data representing display states corresponding to no substantial change in the information contents.

In other words, the printer driver of the tenth embodiment generates the print data by the development of the slide data into multiple pieces of display data each representing each display state corresponding to each transition, by regarding a change in the display contents as the "transition" only when the information contents obtained by the user changes substantially.

In this embodiment, the printer driver judges that a change in the information contents obtained by the user is not substantial when the change is one in display style (color, brightness, pattern, etc.) and includes no change in the semantic content.

Incidentally, while the display state of FIG. 23C is printed without printing the display state of FIG. 23B in the example of FIGS. 24A-24D, the selection from the two display states before and after the unsubstantial change in the information contents may be made differently; printing the display state of FIG. 23B without printing the display state of FIG. 23C is also possible.

Other Embodiments

While the printer driver in each of the above embodiments was an independent program designed as a printer driver, the present invention is not to be restricted to such independent printer drivers. For example, the printer driver may be incorporated in presentation document creation software as a part of its print function.

While the printer driver was implemented as a program (software) in the above embodiments, the printer driver may also be implemented by hardware in accordance with the present invention.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

What is claimed is:

1. A non-transitory computer-readable medium storing computer-readable instructions that, when executed, cause a computer to:
   acquire one piece of slide data;
   determine whether there is a previous display state of the one piece of slide data;
   if there is a previous display state, acquire display contents of the one piece of slide data that have changed from those of the previous display state;
   develop slide data representing transitions of display states into multiple pieces of display data using the acquired display contents, each piece of display data representing each display state corresponding to each transition; and
   generate print data to be used for printing based on the multiple pieces of display data corresponding to transitions obtained by the developing so that at least one slide including only the acquired display contents changing in each transition, selected from all display contents of each piece of display data, is printed.

2. The non-transitory computer-readable medium according to claim 1, wherein generating print data includes generating print data in which the multiple pieces of display data are arranged in one direction in order of transitions.

3. The non-transitory computer-readable medium according to claim 1, wherein generating print data includes generating the print data so that the multiple pieces of display data regarding a piece of slide data are printed on a sheet.

4. The non-transitory computer-readable medium according to claim 3, further storing computer-readable instructions that, when executed, cause the computer to set a print size of the display data printed on the sheet based on a user operation.

5. The non-transitory computer-readable medium according to claim 4, wherein setting the print size includes setting the print size of at least one piece of the display data representing the first display state or the display data representing the last display state at a size different from that of the other pieces of display data.

6. The non-transitory computer-readable medium according to claim 5, wherein setting the print size includes setting the print size of at least one piece of the display data representing the first display state or the display data representing the last display state at a size larger than that of the other pieces of display data.

7. The non-transitory computer-readable medium according to claim 4, wherein generating print data includes generating the print data so that the display data of the largest print size and the display data of the smallest print size are printed on different pages.

8. The non-transitory computer-readable medium according to claim 1, wherein generating print data includes generating the print data so that the display contents changing in each transition are printed in an emphasized state.

9. The non-transitory computer-readable medium according to claim 1, further storing computer-readable instructions that, when executed, cause the computer to display the multiple pieces of display data on a display unit.

10. The non-transitory computer-readable medium according to claim 9, further storing computer-readable instructions that, when executed, cause the computer to select display data to be printed out from the multiple pieces of display data displayed in the displaying based on a user operation.

11. A print data generating device for generating print data to be used for printing, comprising:
a processor; and
memory storing computer-readable instructions that, when executed, cause the processor to provide:
a first acquisition which acquires one piece of slide data;
a comparison unit which determines whether there is a previous display state of the one piece of slide data;
a second acquisition unit which acquires display contents of the one piece of slide data that have changed from those of the previous display state, when there is a previous display state;
a developing unit which develops slide data representing transitions of display states into multiple pieces of display data using the acquired display contents, wherein each piece of display data represents each display state corresponding to each transition; and
a print data generating unit which generates print data to be used for printing based on the multiple pieces of display data corresponding to transitions obtained by the developing unit, the print data generating unit generating the print data so that at least one slide including only the acquired display contents changing in each transition, selected from all display contents of each piece of display data, is printed.

12. The print data generating device according to claim 11, wherein the print data generating unit generates print data in which the multiple pieces of display data are arranged in one direction in order of transitions.

13. The print data generating device according to claim 11, wherein the print data generating unit generates the print data so that the multiple pieces of display data regarding a piece of slide data are printed on a sheet.

14. The print data generating device according to claim 13, wherein the memory stores additional computer-readable instructions that, when executed, further cause the processor to provide:
a print size setting unit which sets print size of the display data printed on the sheet based on a user operation.

15. The print data generating device according to claim 14, wherein the print size setting unit sets the print size of at least one piece of the display data representing the first display state or the display data representing the last display state at a size different from that of the other pieces of display data.

16. The print data generating device according to claim 15, wherein the print size setting unit sets the print size of at least one piece of the display data representing the first display state or the display data representing the last display state at a size larger than that of the other pieces of display data.

17. The print data generating device according to claim 14, wherein the print data generating unit generates the print data so that the display data of the largest print size and the display data of the smallest print size are printed on different pages.

18. The print data generating device according to claim 11, wherein the print data generating unit generates the print data so that the display contents changing in each transition are printed in an emphasized state.

19. A non-transitory computer-readable medium storing computer-readable instructions that, when executed, cause a computer to:
acquire one piece of slide data;
determine whether there is a previous display state of the one piece of slide data;
if there is a previous display state, acquire display contents of the one piece of slide data that have changed from those of the previous display state;
develop the one piece of slide data into multiple pieces of display data using the acquired display contents; and
generate print data based on the multiple pieces of display data obtained by the developing so that the acquired display contents are printed in an emphasized state in at least one slide.

* * * * *

UNITED STATES PATENT AND TRADEMARK OFFICE
CERTIFICATE OF CORRECTION

PATENT NO. : 8,839,103 B2  
APPLICATION NO. : 12/147018  
DATED : September 16, 2014  
INVENTOR(S) : Jun Yamada Page 1 of 1

It is certified that error appears in the above-identified patent and that said Letters Patent is hereby corrected as shown below:

Claims
In Column 17, Claim 11, Line 44
Please delete "acquisition" and insert --acquisition unit--

Signed and Sealed this
Sixteenth Day of August, 2016

Michelle K. Lee
*Director of the United States Patent and Trademark Office*